US008495645B2

(12) United States Patent
Takano et al.

(10) Patent No.: US 8,495,645 B2
(45) Date of Patent: Jul. 23, 2013

(54) SERVER POOL MANAGEMENT METHOD

(75) Inventors: Hideki Takano, Yokohama (JP); Soichi Takashige, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1682 days.

(21) Appl. No.: 11/584,719

(22) Filed: Oct. 19, 2006

(65) Prior Publication Data

US 2007/0094396 A1    Apr. 26, 2007

(30) Foreign Application Priority Data

Oct. 20, 2005    (JP) ................................ 2005-305163

(51) Int. Cl.
*G06F 9/46* (2006.01)

(52) U.S. Cl.
USPC .......................................... 718/104; 718/105

(58) Field of Classification Search
USPC .................. 718/105, 100, 102, 104
See application file for complete search history.

(56) References Cited

U.S. PATENT DOCUMENTS

| | | | |
|---|---|---|---|
| 6,108,697 A | | 8/2000 | Raymond et al. |
| 6,681,391 B1 * | | 1/2004 | Marino et al. ................. 717/175 |
| 2002/0083430 A1 | | 6/2002 | Kusuda et al. ................. 717/174 |
| 2003/0163735 A1 * | | 8/2003 | Kameyama et al. .......... 713/201 |
| 2004/0054780 A1 | | 3/2004 | Romero |
| 2004/0202489 A1 | | 10/2004 | Kudou et al. |
| 2005/0066023 A1 * | | 3/2005 | Sakurai et al. ................. 709/223 |
| 2005/0102674 A1 | | 5/2005 | Tameshige et al. |
| 2005/0144280 A1 * | | 6/2005 | Kawai et al. ................... 709/225 |
| 2005/0234919 A1 * | | 10/2005 | Maya et al. ....................... 707/10 |
| 2005/0289071 A1 * | | 12/2005 | Goin et al. ........................ 705/56 |
| 2006/0095917 A1 * | | 5/2006 | Black-Ziegelbein et al. . 718/104 |

FOREIGN PATENT DOCUMENTS

| | | |
|---|---|---|
| JP | 06-314994 A | 11/1994 |
| JP | 2002-163241 A | 6/2002 |
| JP | 2003-316581 | 11/2003 |
| JP | 2008-011522 A | 1/2008 |

OTHER PUBLICATIONS

Kusaka et al. JP Patent No. 2002163241 A (Machine Translation), Jun. 7, 2002.*
Okabe, JP Patent No. 2003115922 A (Machine Tranlation), Apr. 18, 2003.*
Osamu Egashira, Norton Ghost Ver.5.1 Drive Image Pro 3.0, Interop Magazine, vol. 9, No. 5, pp. 262-263 (1999).
Fujino Touyama, Windows NT Hotspot, The Largest Feature of Office 2000?, Gijutsu-Hyohron Co. Ltd., # 6, pp. 206-209 (1999).
Japan Patent Office (JPO) office action for JPO patent application JP2005-305163 (Feb. 4, 2010).

* cited by examiner

*Primary Examiner* — Emerson Puente
*Assistant Examiner* — Willy W Huaracha
(74) *Attorney, Agent, or Firm* — Kilpatrick Townsend Stockton LLP

(57) ABSTRACT

Standby computers are dynamically divided into groups according to the difference between the software thereof and the software required of a business system. When a computer is made available, the standby computers divided into groups by software structure are searched and an appropriate one is extracted to quickly complete the construction of the software environment. An active computer, if to be transferred to standby mode, is associated with the group having the same software structure as the business system with which the active computer has thus far operated. The active/standby states of the computers are monitored, and the standby computers are changed thereby to widen the possible range of application to other business systems, removing copy operation of disk images from the active computer to the standby computers.

3 Claims, 29 Drawing Sheets

FIG. 1 CONFIGURATION OF SERVER POOL MANAGEMENT SYSTEM

CONCEPT OF GROUPING IN SERVER POOL

HOST CONFIGURATION

PHYSICAL CONFIGURATION

LOGIC CONFIGURATION OF BUSINESS

FIG. 6
GROUP MANAGEMENT TABLE

| | ID | BUSINESS FLAG | CONFIGURATION SOFTWARE LIST | HOST SEARCH PATH | DERIVATIVE GROUP LIST | HOST NAME | IP ADDRESS | ARRANGEMENT TIME |
|---|---|---|---|---|---|---|---|---|
| BUSINESS A | | true | | 1 | | host1 | 192.168.1.101 | 2004/10/12 11:22:08 |
| | | | | | | host2 | 192.168.1.102 | 2004/10/18 14:00:38 |
| BUSINESS B | | true | | 3 | | host5 | 192.168.1.105 | 2004/10/7 21:57:05 |
| | | | | | | host8 | 192.168.1.108 | 2004/10/10 17:08:31 |
| BUSINESS C | | true | | 2 | | host10 | 192.168.1.110 | 2004/10/12 21:07:11 |
| | 0 | false | | | 2,4 | host11 | 192.168.1.111 | 2005/1/10 15:00:05 |
| | | | | | | host12 | 192.168.1.112 | 2005/1/10 15:05:23 |
| | 1 | false | APPLICATION A | 4 | BUSINESS A | host3 | 192.168.1.103 | 2005/1/25 10:20:08 |
| | 2 | false | RHELAS3 JBoss APPLICATION C | 0 | BUSINESS C | host7 | 192.168.1.107 | 2004/12/20 20:12:53 |
| | 3 | false | APPLICATION B | 4 | BUSINESS B | host4 | 192.168.1.104 | 2005/1/22 18:30:07 |
| | 4 | false | Win2003 Cosminexus | 0 | 1,3 | host6 | 192.168.1.106 | 2004/11/28 22:01:30 |
| | | | | | | host9 | 192.168.1.109 | 2004/10/8 21:20:19 |

FIG. 7

ENVIRONMENT CONSTRUCTION AVERAGE TIME MANAGEMENT TABLE

| | (AVERAGE) TIME REQUIRED FOR INSTALLATION | (AVERAGE) TIME REQUIRED FOR UNINSTALLATION | NUMBER OF TIMES INSTALLED | NUMBER OF TIMES UNINSTALLED |
|---|---|---|---|---|
| BUSINESS SYSTEM A (DISK IMAGE) | 3300 SEC. | | 7 | |
| BUSINESS SYSTEM B (DISK IMAGE) | 2800 SEC. | | 5 | |
| BUSINESS SYSTEM C (DISK IMAGE) | 3520 SEC. | | 5 | |
| OS1 | | | 0 | 0 |
| OS2 | | | 0 | 0 |
| AP SERVER 1 | 280 SEC. | 230 SEC. | 9 | 7 |
| AP SERVER 2 | 120 SEC. | 75 SEC. | 4 | 3 |
| APPLICATION A | 180 SEC. | 20 SEC. | 7 | 5 |
| APPLICATION B | 200 SEC. | 15 SEC. | 5 | 2 |
| APPLICATION C | 150 SEC. | 25 SEC. | 4 | 3 |

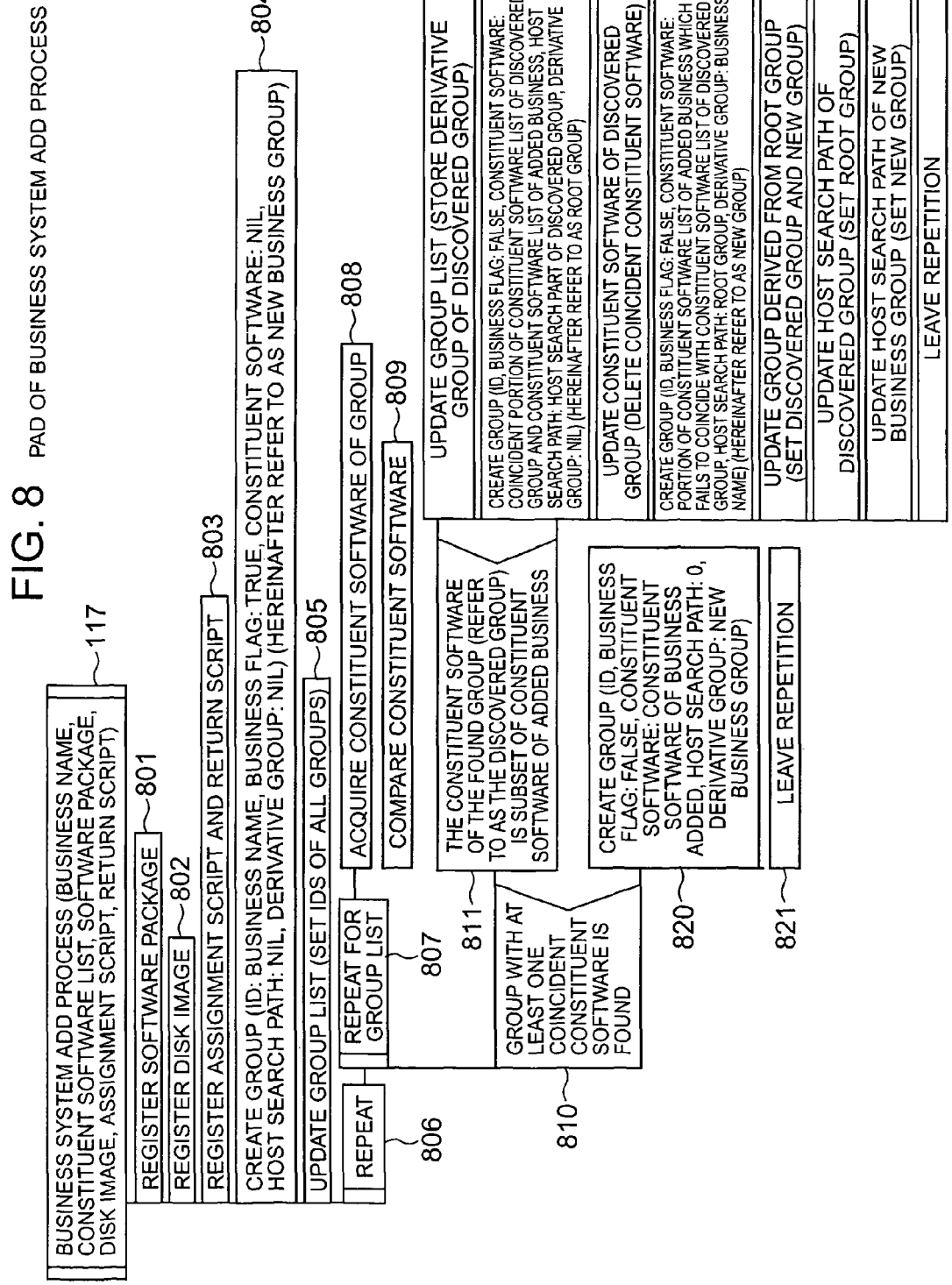

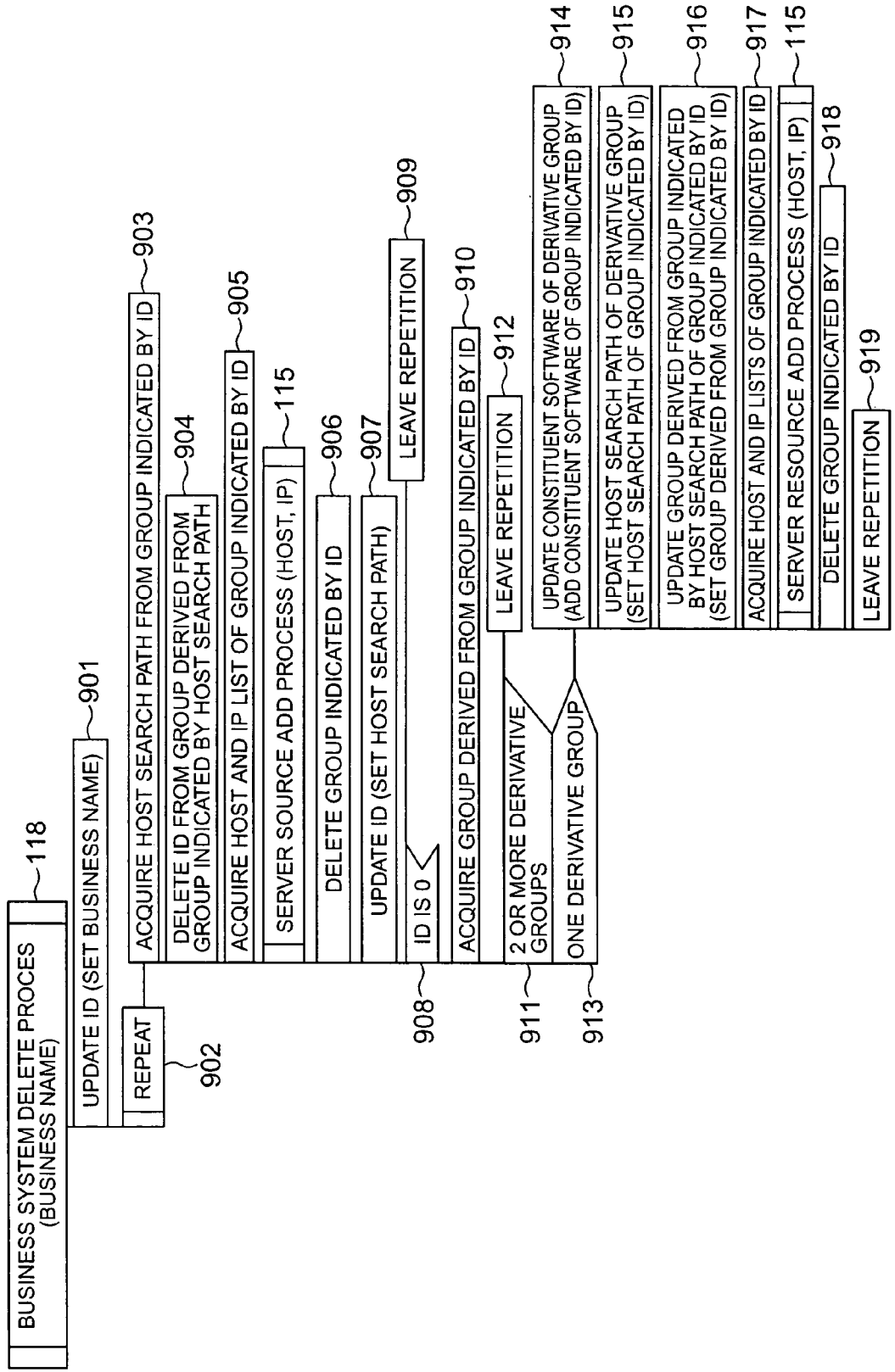
FIG. 9  PAD OF BUSINESS SYSTEM DELETE PROCESS

PAD OF SERVER RESOURCE ADD PROCESS

PAD OF SERVER RESOURCE DELETE PROCESS

FIG. 12 PAD OF HOST ASSIGNMENT PROCESS

PAD OF HOST SEARCH PROCESS

PAD OF HOST ENVIRONMENT CONSTRUCTION PROCESS

PAD OF HOST RETURN PROCESS

PAD OF GROUP REVIEW PROCESS

FIG. 17 CONFIGURATION OF SERVER POOL MANAGEMENT SYSTEM

PHYSICAL CONFIGURATION INCLUDING STORAGE

FIG. 19

GROUP MANAGEMENT TABLE
GROUP MANAGEMENT TABLE USED FOR STORAGE

| ID | BUSINESS FLAG | CONSTITUENT SOFTWARE LIST | LU SEARCH PATH | DERIVATIVE GROUP LIST | LU No. | STORAGE PORT No. | HOST NAME | IP ADDRESS | ARRANGEMENT TIME |
|---|---|---|---|---|---|---|---|---|---|
| BUSINESS A | true | | 1 | | LU2 | 1 | host1 | 192.168.1.101 | 2004/10/12 11:22:08 |
| | | | | | LU5 | 2 | host2 | 192.168.1.102 | 2004/10/18 14:00:38 |
| BUSINESS B | true | | 3 | | LU1 | 1 | host5 | 192.168.1.105 | 2004/10/7 21:57:05 |
| | | | | | LU10 | 3 | host8 | 192.168.1.108 | 2004/10/10 17:08:31 |
| BUSINESS C | true | | 2 | | LU8 | 2 | host10 | 192.168.1.110 | 2004/10/12 21:07:11 |
| 0 | false | | | 2,4 | LU3 | 3 | | | 2005/1/10 15:00:05 |
| | | | | | LU12 | 1 | | | 2005/1/10 15:05:23 |
| 1 | false | APPLICATION A | 4 | BUSINESS A | LU7 | 2 | | | 2005/1/25 10:20:08 |
| 2 | false | RHEL AS3 JBoss APPLICATION C | 0 | BUSINESS C | LU14 | 3 | | | 2004/12/20 20:12:53 |
| | | | | | LU6 | 2 | | | 2005/1/21 15:03:00 |
| 3 | false | APPLICATION B | 4 | BUSINESS B | LU15 | 3 | | | 2005/1/22 18:30:07 |
| | | | | | LU9 | 1 | | | 2005/1/20 22:11:10 |
| | | | | | LU13 | 1 | | | 2005/1/10 01:25:53 |
| 4 | false | Win2003 Cosminexus | 0 | 1,3 | LU11 | 2 | | | 2004/11/28 22:01:30 |
| | | | | | LU4 | 3 | | | 2004/10/8 21:20:19 |

FIG. 20
HOST MANAGEMENT TABLE

HOST MANAGEMENT TABLE 1701

| HOST NAME | IP ADDRESS (2002) | HOST-SIDE STORAGE IF PORT No. (2003) | USAGE (2004) |
|---|---|---|---|
| host1 | 192.168.1.101 | 00:00:00:00:00:00:00:01 | BUSY |
| host2 | 192.168.1.101 | 00:00:00:00:00:00:00:02 | BUSY |
| host3 | 192.168.1.105 | 00:00:00:00:00:00:00:03 | UNBUSY |
| host4 | 192.168.1.108 | 00:00:00:00:00:00:00:04 | UNBUSY |
| host5 | 192.168.1.110 | 00:00:00:00:00:00:00:05 | BUSY |
| host6 | 192.168.1.111 | 00:00:00:00:00:00:00:06 | UNBUSY |
| host7 | 192.168.1.112 | 00:00:00:00:00:00:00:07 | UNBUSY |
| host8 | 192.168.1.103 | 00:00:00:00:00:00:00:08 | BUSY |
| host9 | 192.168.1.107 | 00:00:00:00:00:00:00:09 | UNBUSY |
| host10 | 192.168.1.104 | 00:00:00:00:00:00:00:10 | BUSY |
| host11 | 192.168.1.106 | 00:00:00:00:00:00:00:11 | UNBUSY |
| host12 | 192.168.1.109 | 00:00:00:00:00:00:00:12 | UNBUSY |

(Column label 2001 = HOST NAME)

PAD OF SERVER RESOURCE ADD PROCESS

PAD OF SERVER RESOURCE DELETE PROCESS

PAD OF LU ADD PROCESS

PAD OF LU DELETE PROCESS

FIG. 25 PAD OF HOST ASSIGNMENT PROCESS

PAD OF LU SEARCH PROCESS

PAD OF HOST RETURN PROCESS

PAD OF LU OPERATION MEANS

LOGIC CONFIGURATION OF BUSINESS

PAD OF HOST USE PREPARATION MEANS

PAD OF HOST USE END MEANS

SERVER POOL MANAGEMENT METHOD

BACKGROUND OF THE INVENTION

This invention relates to an information system for providing a part of a plurality of computer resources and the function thereof to a plurality of business systems of customers, or in particular to a management technique of an information system adapted to meet sharp changes of the processing request of each business system.

An information system finds practical applications in which a part of a plurality of computer resources and the function thereof are provided to on-demand service providers and data centers mainly dealing with the batch processing or customers who are required to handle/process a predetermined amount of accesses and data processing jobs within a predetermined period of time.

The importance of constructing a business system using this information system and reducing the cost by improving the business efficiency has been widely recognized, and demand for this information system has been ever on the increase. In the operation of an information system such as the internet Web site publicly accessible from a multiplicity of unspecified customers, for example, the computer resources capable of processing a predicted maximum load (accesses or processing requests) are always assigned.

The information system, therefore, normally holds excessive computer resources for a light load, and poses the problem of how effectively the computer resources are to be utilized.

US 2004/0054780A1 proposes a technique in which host resources that can be shared by a plurality of business systems are prepared with the intention of overcoming an unexpectedly heavy load without any host resources capable of handling the maximum load estimated for each business system. In this case, a host is retrieved from a server pool and a disk image (a software group sufficient to make the host resources "active") prepared to be built in the business system is copied to the host.

The related copying technique is disclosed in JP-A-2003-316581, for example, in which the copying efficiency is improved by comparing a list of software already installed in the host with a list of software to be installed in the host, and installing only the difference for a plurality of computer resources.

Also, US 2005/0102674 briefly describes a method, in which standby computer resources in dead standby mode are loaded into active computer resources by predicting a load based on the past operation history, and thus the logical server transfer (provisioning) is achieved.

An information system is known in which standby computers are made available in the case where the processing requests are concentrated on a given business system. In the information system operating the Web site, for example, the process is executed to assign the accesses of the processing requests to the computer resources in the server pool where a plurality of servers stand by. Also, standby computer resources in dead standby state are newly added to the server pool to meet the processing requests.

In the prior art, the entire disk image (software) of the computers in operation are copied to the standby computers to be made available, and therefore the preparation time consumes too much time. Specifically, in copying the disk image of the computer in operation (active host) of a business system, the time required for preparation is increased in proportion to the image capacity, and therefore, it is difficult to handle an unexpectedly sharp load change readily.

Also, the conventional methods fail to make specifically apparent how to quickly find out a server assigned to a business system from a plurality of servers (standby computer resources) in a server pool, and what kind of software environment construction means is used for the server to assure the quickest assignment to the business system. Thus, it is not clear how an information system is to be constructed.

SUMMARY OF THE INVENTION

The object of this invention is to provide a system in which the time required to retrieve a standby host from a virtual repository (server pool) and build it in a business system is shortened, and an unexpectedly heavy load which may occur in the business system can be handled quickly. This invention is also effectively applicable to a case in which an active host having developed a fault is replaced by a standby host.

The information system has the function of dynamically dividing the standby computers into a plurality of groups each including a plurality of the standby computers according to the difference between the software of the standby computers and the software required by the business system. In making a computer available, the standby computers grouped by the software structure are retrieved and extracted to complete the construction of the software environment quickly. An active computer, if transferred to the standby mode, is associated with the same group of software structure as the business system in which the computer has thus far operated. The active/standby state of the computers are monitored, and the software is removed appropriately from the computers. In this way, the group of the standby computers is changed and the range applicable to other business systems is widened.

(1) In the information system according to this invention, in the case where the processing requests are unexpectedly concentrated on a given business system and the load on the hosts in operation (active host) in the corresponding information system increases to a high level, the standby computers (standby hosts) constituting the computer resources standing by in a virtual repository are used and assigned from the repository for the processing in the business system. In this way, the standby hosts are managed to ride over the heavy load. The standby hosts, which are conceptually defined as a single computer in terms of a hardware resource, may be a plurality of virtual computers on a single computer as far as security is maintained.

(2) Also, the information system according to this invention includes a means for comparing the software group required for execution of a given business system with those of a plurality of business systems and dividing the standby hosts in the repository into groups in accordance with whether a predetermined software is installed or not. The information system according to this invention includes a list of software to be installed in the standby hosts of each group and a means for installing an application software or the like software of a large capacity in each standby host. The software list includes, for example, the software to be installed in the host of a given group such as Windows (OS) (the registered trademark of Microsoft Corporation) or middleware Tomcat (the trademark of Apache Software Foundation).

(3) The information system according to the invention also includes a means for comparing, in assigning a standby host to a business system, the software structure of the standby host with that of the prospective assignee business system and retrieving the standby host by tracking the software structure of each group in the order of similarity.

Using these means, a standby host to be assigned to the business system anew is found and the software environment constructed quickly.

Specifically, in the case where a standby host (server) is assigned for execution of a given business system, for example, the standby hosts of a group having the software most similar to the software of the active hosts required for execution of the particular business system are searched first. By this group-by-group software search over the computer resources, the standby host capable of constructing the software environment fastest for execution of the particular business system can be found out.

(4) In returning an active host thus far assigned to a business system to the virtual repository or the server table, the software structure of the host to be returned is compared with the software structure of the standby hosts in the repository to which the active host is to be returned, and the host is returned directly to the group having the hosts of the same structure without being uninstalled. Therefore, even software of large capacity is not required to be uninstalled.

(5) The history of usage of the standby hosts in each group is held and monitored, and in the presence of a host whose unbusy period is long, the particular host is transferred to a different group. The different group finds a wider application. By these means, the computer resources of the information system can be effectively utilized. The expression "unbusy period" is a length of time during which a particular host is standing by without being transferred to an active host, and macroscopically lasts for a period of several minutes to several months as designated by the user.

BRIEF DESCRIPTION OF THE DRAWINGS

FIG. 6 is a diagram showing a group management table 122 of FIG. 1.

FIG. 7 is a diagram showing an environment construction average time management table 123 of FIG. 1.

FIG. 8 shows the PAD (problem analysis diagram) of a business system add process 117 of FIG. 1.

FIG. 9 shows the PAD of a business system delete process 118 of FIG. 1.

FIG. 19 is a diagram showing a group management table 122 of FIG. 17.

FIG. 20 is a diagram showing a host management table 1701 of FIG. 17.

DETAILED DESCRIPTION OF THE INVENTION

<Concept of Group>

The elements making up a group of active hosts or standby hosts include at least two different computer resources. The computer resources include a virtual computer. This is by reasons of the fact that the invention is applicable also to a case in which two or more virtual computers exist on one hardware computer.

Figure 2:
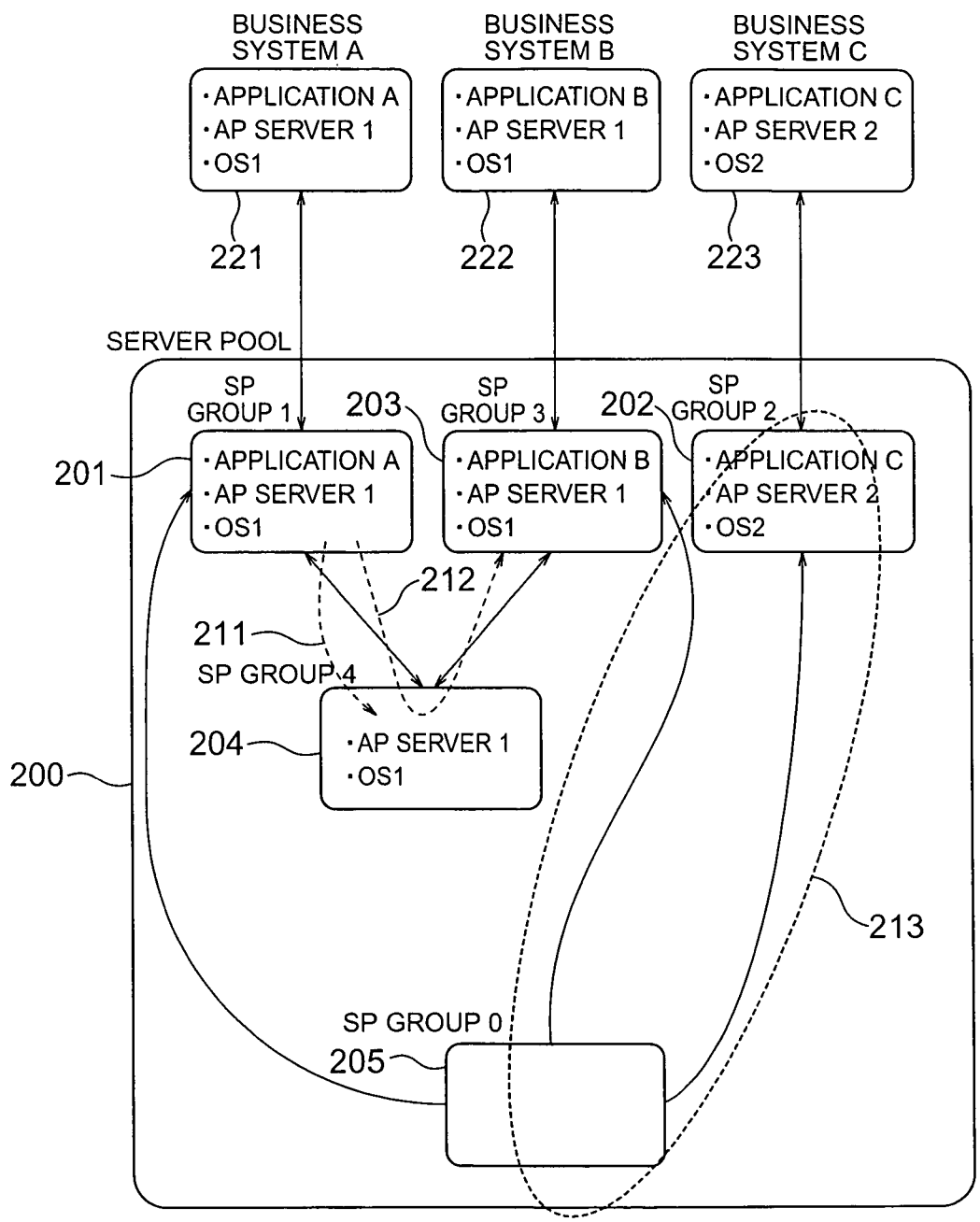
FIG. 2 is a diagram showing the manner in which the hosts are divided into groups in accordance with the difference between the software resources required by each business system and the software resources of the computers standing by in the server pool.

FIG. 2 is a diagram showing the correspondence between the software resources required of each of business systems A to C and the standby hosts (not shown) divided into groups in accordance with the presence or absence of software resources in the server pool. The concept of the group is explained below with reference to this diagram.

Assume that three systems including a business system A 221, a business system B 222 and a business system C 223 are operating in an information system. The business system A 221 uses an application A, an AP server 1 as middleware and an OS1 as an operating system. In similar fashion, the business system B 222 uses an application B, the AP server 1 and the OS1. The business system C 223, on the other hand, uses an application C, an AP server 2 and an OS2. The OS, the middleware and the application are installed in that order.

Based on the difference in the software constituting each business system, groups are created in the server pool 200. First, consider the business system A 221 and the business system B 222. The OS1 and the AP server 1 are installed in the same order (in FIG. 2, the lower software is first installed upward), and therefore, a SP group 4 (204) is first determined. These business systems have different applications, and therefore a SP group 1 (201) and a SP group 3 (203) are also determined. As to the business system C having no software shared by other business systems, a SP group 2 (202) is determined. Also, a SP group 0 (205) storing a standby host installed with nothing is prepared. These SP groups also accept the absence of a standby host (0 standby host) (although the group exists).

Figure 5:
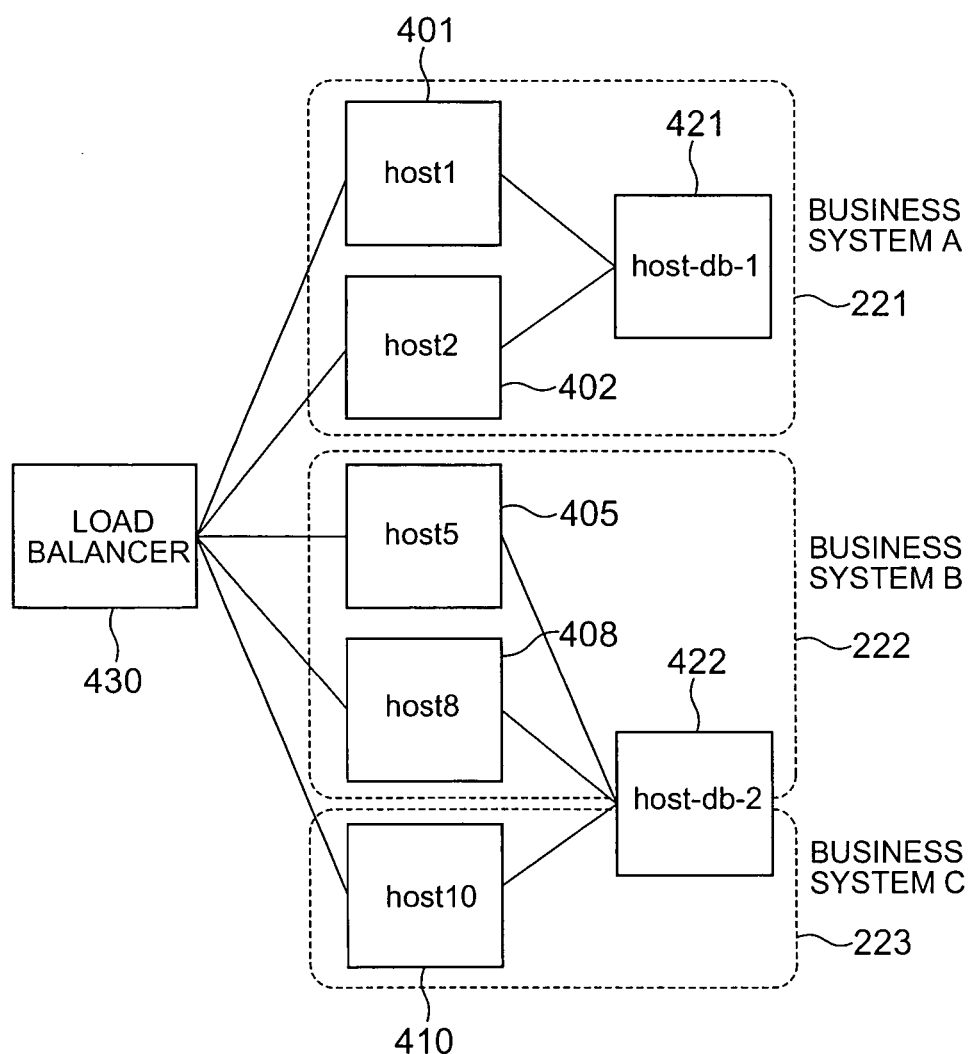
FIG. 5 is a diagram showing a logic configuration of a plurality of business systems A to C, active hosts including a host for the data base and a load balancer 430.

In the case where the business system A 221 requests a new active host, the standby hosts are searched in the SP group 1 (201) and the SP group 4 (204) in that order (211). In the case where a standby host is found in the SP group 1, the particular standby host can be directly built in the business system A 221. The wording "built in the business system" indicates, as described below, that the processing request from a load balancer 430 shown in FIG. 5 is made acceptable. In the case where a standby host is found in the SP group 4, on the other hand, the particular standby host is set in a state usable for the application A (described later) and then built in the business system A 221.

In the case where no standby host is found, the SP group 3 (203) is searched for a standby host (212). A standby host, if found in the SP group 3, is uninstalled with the application B and, after being set into a state adapted to use the application A, built in the business system A 221.

In the case where no standby host is found also in the search route 212, the SP group 0 (205) and the SP group 2 (202) are searched in that order for a standby host (213). In this way, the groups are searched for a host in the descending order of similarity to the constituent software of the business system A 221, and in the absence of an appropriate host, another SP group is searched on condition that the application is uninstalled.

Figure 1:
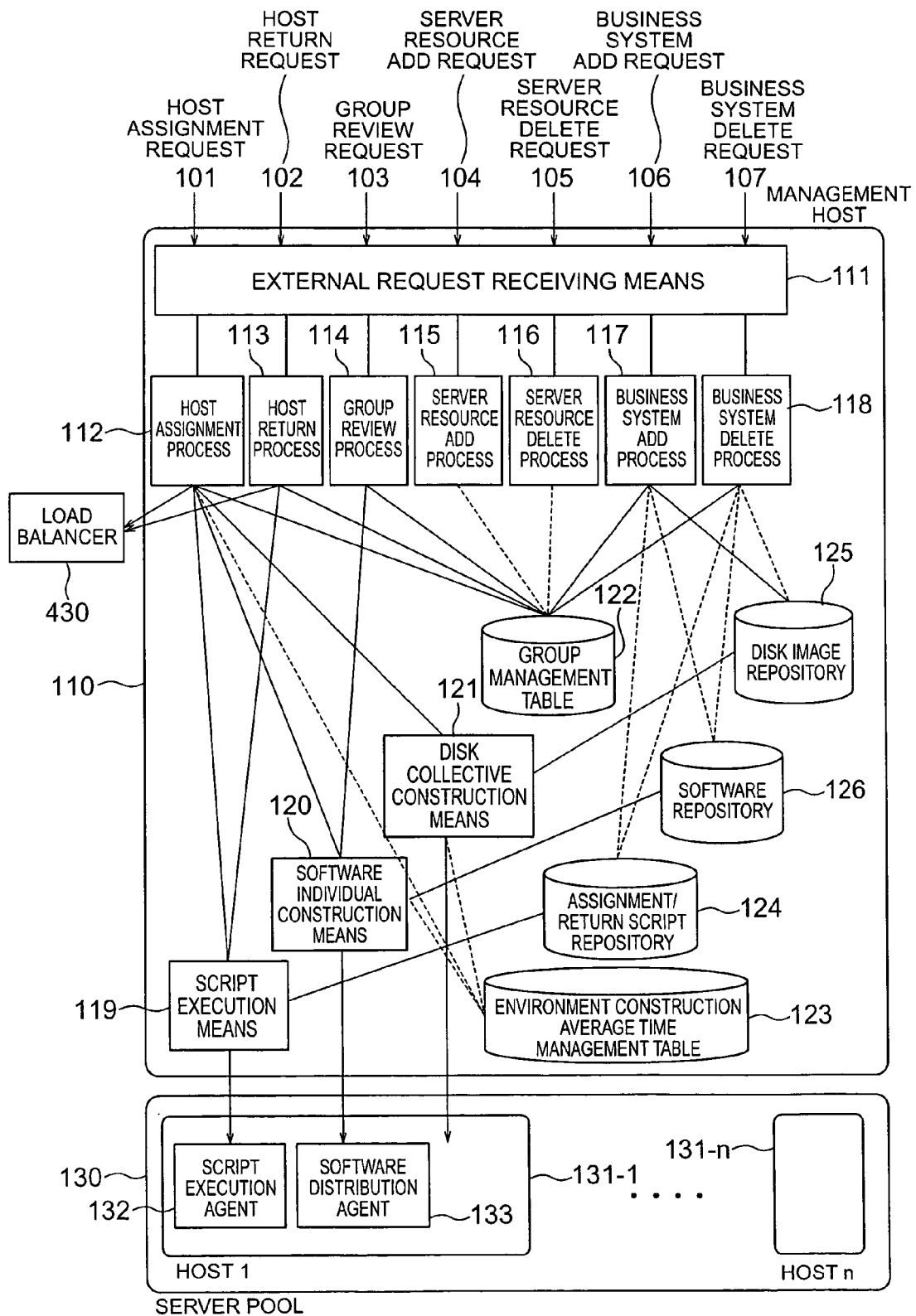
FIG. 1 is a diagram showing a configuration of an information system built around a management host 110.

FIG. 1 is a diagram showing a configuration of an information system built around a management host 110.

The management host 110 is provided to manage the standby hosts including host 1 (131-1) to n (131-n) in the serve pool 130. The management host 110 has arranged therein a group management table 122, an environment construction average time management table 123, a software repository 126, a disk image repository 125 and an assignment/return script repository 124.

The group management table 122 has stored therein a list of the groups, a list of the software required to be installed when a standby host is associated with the groups (stored in the order of installation), a search path for retrieving the optimum standby host, a list of groups derived from the particular group, a list of hosts and IP addresses of the hosts included in the particular group and the time at which each standby host is associated with the particular group (FIG. 6, described later).

The environment construction average time management table 123 has stored therein the average time required to copy the software environment of a given business system with a disk image and the average time required to install/uninstall the software individually. Also, the number of times thus far installed is also stored to calculate the average time. Each of these time can be measured by the OS acquiring the time on the clock held in the computer.

The software repository 126 has stored therein the software package used in a business system, and the disk image repository 125 the disk image of the host used in each business system. The assignment/return script repository 124 has stored therein a file describing the process of executing the assignment of a standby host to a business system or the return of an active host to the server pool and a program for security.

The program for security has the function of deleting the confidential information when returning an active host to the server pool and is executed by a script execution means 119.

The information system is normally comprised of three layers including a Web server, an AP server and a data base server. The confidential information (contents, customer information, etc.) are not held in the Web server and the AP server. The password of the data base and the membership number of the contents, however, may be held, and therefore, the deletion process by the script execution means 119 is effective. The computer resources to be made available under a heavy load are the Web server and the AP server, and security can be protected by deleting the confidential information such as the password of the data base in the aforementioned manner.

Each of the tables and the repositories described above can be located at any place accessible by the management host 110 and not necessarily arranged in the host 110.

<Management Host 110>

The management host 110 implements the seven functions described below.

(1) Function to Add Business System

This function is executed in the case where a new business system is constructed in the information system. To construct a new business system in the information system is mainly the job of the operator.

An external request receiving means 111 receives a business system add request 106 (FIG. 1) and accesses a business system add process 117. The business system add process 117 examines the difference between the constituent software for the business system to be added and the that of the existing group, and updates the group configuration of the group management table 122 (described later). Also, the disk image of the business system to be added is registered and stored in a disk image repository 125, the software package to be used in a software repository 126, and the assignment/return script in an assignment/return script repository 124.

(2) Function to Delete Business System

This function is the process executed to remove the business system which has ceased to use the information system, as an object to be managed by the management host 110. The business system delete request 107 is received by the external request receiving means 111, and a business system delete process 118 is accessed. In the business system delete process 118, the active hosts and the standby hosts of the group associated only with the business system to be deleted are deleted from the group management table 122.

Also, the software and the program file associated only with the business system to be deleted are deleted from the software repository 126, the disk image repository 125 and the assignment/return script repository 124.

(3) Server Resource Add Function

This function is to add a standby host anew to the server pool in terms of software. After the computer resource constituting a standby host is connected to the network and becomes communicable, assume that a server resource add request 104 is issued. The request 104 is received by the external request receiving means 111, and the server resource add process 115 is accessed. In the server resource add process 115, a new computer resource is added as a designated standby host to the SP group 0 (FIG. 2, 205) of the group management table 122.

(4) Function to Delete Server Resource

This function is to remove a standby host from the server pool. A server resource delete request 105 is received by the external request receiving means 111, and the server resource delete process 116 is accessed. In the server resource delete process 116, the designated standby host, if not built in the business system, is deleted from the group management table 122. The standby host to be deleted is subjected to maintenance/inspection and the software thereof (BIOS) updated.

(5) Function to Assign Host

This function is to add a standby host to a business system from the server pool 130. Upon receipt of a host assignment request 101 by the external request receiving means 111, a host assignment process 112 is accessed. The host assignment process 112, using the group management table 122 and the environment construction average time management table 123, searches for a standby host and the construction method capable of preparing the business environment at the earliest time. In accordance with the construction method, the host assignment process 112 appropriately accesses a disk collective construction means 121 and a software individual construction means 120. The software individual construction means 120 thus accessed sends a software distribution agent 133 to the standby host 1, which software distribution agent 133 is executed by the particular standby host 1. Finally, a script execution agent 132 is sent to the standby host 1 using a script execution means 119 and the assigned script is executed. Then, the load balancer 430 starts the distribution so that the business request may reach the standby host 1 thereby to transfer the standby host 1 to an active host.

(6) Function to Return Host

This function is to cancel the active host built in a business system and return the active host to the server pool 130. Upon receipt of a host return request 102 by the external request receiving means, a host return process 113 is accessed. In the host return process 113, first, the distribution by the load balancer 430 is stopped so that no business request may arrive. Next, the return script is distributed to the active host to be canceled, using the script execution means 119, and the script is executed.

After that, the active host to be canceled is associated with the SP group in the server pool 130 nearest to the software environment. In the case of the business system A 221 shown in FIG. 2, the host is returned to the SP group 1 (201).

(7) Function to Review the Group

This function is to investigate the history of the usage of the standby hosts in the server loop 130, and any standby host unbusy is associated with the SP group finding a wider application. The term "unbusy" indicates "standing by without becoming an active host" or macroscopically, means "standing by for several minutes to several months". In the case where the SP group 1 (201) shown in FIG. 2 has a standby host rather unbusy, for example, it is associated again with (transferred to) the SP group 4 (204). Upon receipt of a group review request 103 by the external request receiving means 111 (FIG. 1), a group review process 114 is started. In the presence of a standby host unbusy for a longer time than a predetermined threshold value, the group review process 114 transfers the particular standby host to the SP group finding a wider application. One threshold value, which is set for the server pool as a whole, can alternatively be set for each SP group or each standby host.

In the case where one threshold value is set for each SP group, the threshold value is shortened for the group of standby hosts to process a business system with the load thereof becoming heavy less frequently. This is in order that a standby host built in a business system, used and returned may be immediately transferred to the SP group finding a wider application.

The threshold value, if set for each standby host (FIG. 3), is shortened for the standby host with high performance in CPU or memory capacity so that the particular standby host may be built in and used for various business systems. The threshold for the standby host 300 low in specification, on the other hand, is lengthened for use with the business system increased in load less frequently in order not to use for other business systems unless the load thereof increases excessively.

In the case where a standby host is transferred to a SP group finding a wider application as the result of review by this function, the software not to be installed in the transferee SP group is uninstalled appropriately in advance using the software individual construction means 120.

The standby host, which is associated with the SP group finding the widest application and already installed with the OS such as the SP group (202) or the SP group 4 (204) shown in FIG. 2, is set not to be transferred.

<Standby Host 300>

Figure 3:
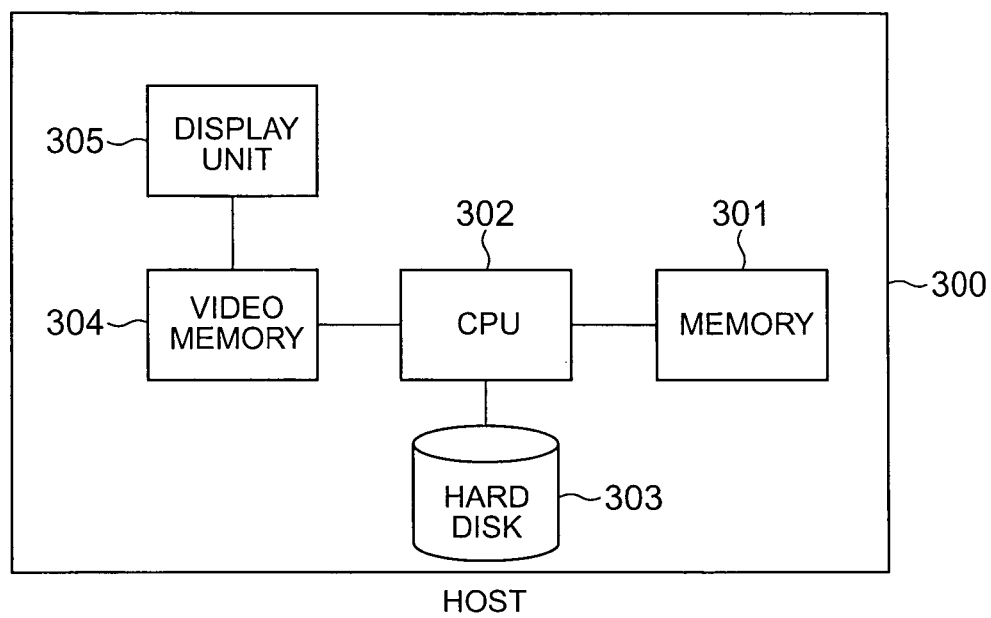
FIG. 3 is a diagram schematically showing the hardware configuration of the standby host 300.

FIG. 3 schematically shows a hardware configuration of the standby host 300. This standby host is also a computer resource to become an active host by being built in a business system.

The host 300 is configured of a hard disk 303, a central processing unit 302, a memory 301, a video memory 304 and a display unit 305. The software and data can be stored in the hard disk 303, and the software and data thus stored can be stored appropriately in the memory 301 using the central processing unit 302. The software stored in the memory 301 is executed by the central processing unit 302. Once the data is written in the video memory 304 by the central processing unit 302, the information can be displayed to the user through the display unit 305.

Also, without any local hard disk 303, the standby host 300 and an external storage unit may be connected to each other through an optical fiber or the like, and the external storage unit may be used for storing the software or data.

Embodiments of the invention are described below.

First Embodiment

The standby hosts associated with the server pool are divided into groups in accordance with the software constituting the active host operated to process a business system. An embodiment is described below in which the business system with which a standby host is associated is changed in accordance with the frequency of use thereby to optimize the number of the standby hosts included in a group.

<Hardware Configuration of Information System>

Figure 4:
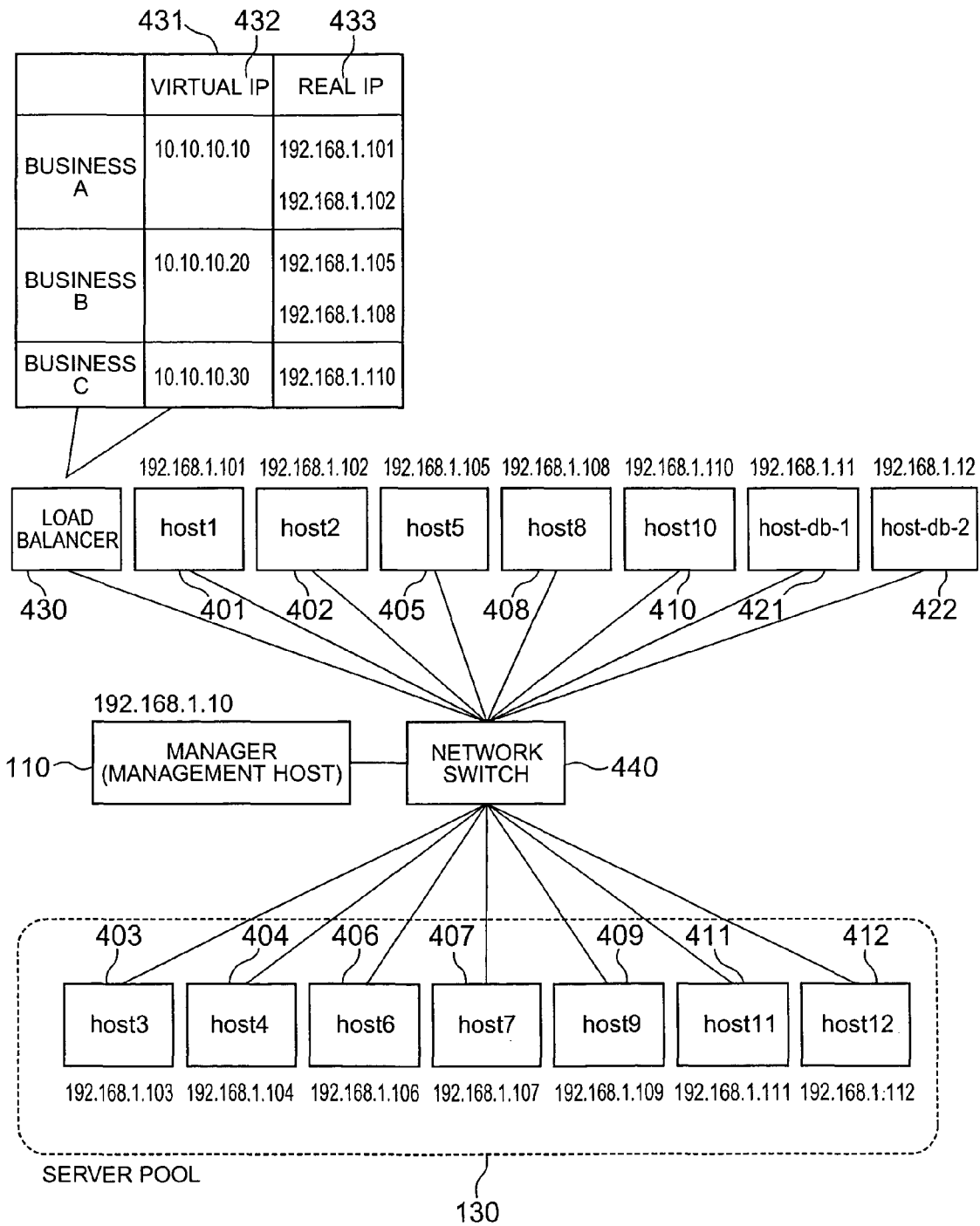
FIG. 4 is a diagram showing an example of the physical configuration of the information system for processing various business systems.

An example of a physical configuration of an information system for processing various business systems is shown in FIG. 4. According to this embodiment, a total of 15 hosts including active hosts, standby hosts and a management host are used.

A load balancer 430 is a load distributor which has such a function that the requests sent from the user to the information system through the Web application are distributed to the active hosts in the information system and the result of response from the active hosts is returned to the user. A network switch 440 interconnects the load balancer 430, the active hosts, the management host (manager) 110 and the standby hosts. A host 1 (401) and a host 2 (402) are used as an application active host for a business system A 221, a host 5 (405) and a host 8 (408) as an application active host for a business system B 222, and a host 10 (410) as an application active host for a business system C 223.

A host-db-1 (421) is a host operated by the data base software for storing the data used by the business system A, and a host-db-2 (422) operated by the data base software for storing the data used by the business systems B and C.

A host 3 (403), a host 4 (404), a host 6 (406), a host 7 (407), a host 9 (409), a host 11 (411) and a host 12 (412) are standby hosts not used for any business system and stored in the server pool 130.

The load balancer 430 sets a correspondence between a virtual IP 432 and a real IP 433 of the active host actually executing the process for each business system. The virtual IP 432 of the business system A, for example, is 10.10.10.10, while the active hosts processing the request that has actually arrived are the host 1 (401) and the host 2 (402). Thus, the correspondence is set between the IP addresses 192.168.1.101 and 192.168.1.102. In the load balancer 430, the request which may arrive at 10.10.10.10 is transferred to 192.168.1.101 or 192.168.1.102. In similar fashion, the virtual IP 432 of the business system B is 10.10.10.20, and the real IP 433 includes 192.168.1.105 and 192.168.1.108. The virtual IP 432 of the business system C is 10.10.10.30, and the real IP 433 is 192.168.1.110. According to this embodiment, all the business systems are assumed to be processed in the same LAN for simplification.

FIG. 5 shows a logic configuration of a plurality of business systems A to C and active hosts including data base hosts and the load balancer 430. The business system A 221 is configured of the host 1 (401), the host 2 (402) and the host-db-1 (421). The host 1 (401) and the host 2 (402) each have arranged therein an AP server and an application A for processing the request from the user of the application of the business system A, while the host-db-1 (421) has arranged therein the data base software for storing the data used by the application A. The request to the application of the business system A is distributed by the load balancer 430 to the host 1 (401) or the host 2 (402).

The business system B 222 is configured of the host 5 (405), the host 8 (408) and the host-db-2 (422). The host 5 (405) and the host 8 (408) each have arranged therein an AP server and an application B, while the host-db-2 (422) has arranged therein the data base software for storing the data used by the application B. The request to the application of the business system B is distributed by the load balancer 430 to the host 5 (405) or the host 8 (408).

The business system C (223) is configured of the host 10 (410) and the host-db-2 (422). The host 10 (410) has arranged therein an AP server and an application C, and the host-db-2 (422) has arranged therein the data base software for storing the data used by the application C. Specifically, the data base software of the host-db-2 (422) has stored therein the data used by the application B and the application C. The request to the application of the business system C arrives at the host 10 (410) through the load balancer 430. In this configuration, the performance of the business system may be improved by increasing the hosts operated by the application and thereby increasing the objects of load distribution.

According to this embodiment, an information system is provided in which in the case where requests are concentrated on a given business system and the response time is reduced or otherwise the performance is reduced, a standby host is selected from the server pool 130 thereby to increase the active hosts for executing the application.

<Software Configuration of Information System>

The software configuration of an information system is shown in FIG. 1. The server pool 130 is managed by the management host 110. The management host 110 includes a group management table 122, an environment construction average time management table 123, a software repository 126, a disk image repository 125 and an assignment/return script repository 124.

FIG. 6 shows the group management table 122. In the table, the business A, the business B and the business C represent the business systems A 221, B 222 and C 223, respectively. The active host built in each business system, though not existing in the server pool 130, is managed by the group management table 122 equally to the standby host in the server pool 130. The management items include ID 601 for identifying the group of the host, a business flag 602 indicating whether the particular host is an active host (true) or a standby host (false), a list 603 (only the difference with the constituent software of the group indicated by the host search path) of the constituent software to be installed when associated with each identified group, a host search path 604 (group ID) for searching the server pool for a standby host in response to a request for an active host from a business system, a list 605 (group ID) of derivative groups constituting other groups derived from a particular group, a list 606 of standby hosts (or active hosts) associated with the group, an IP address list 607 for the hosts and an arrangement time 608 at which the host is associated with the group.

FIG. 7 shows the environment construction average time management table 123. The table 123 has stored therein the time (average time) 701 required to copy the disk image or to install the individual software, the time (average time) 702 required to uninstall, the number of times 703 installed, and the number of times 704 uninstalled. In the case of FIG. 7, the business systems A to C are not meaningfully uninstalled, and therefore, the number of times uninstalled is indicated as "-". If uninstalled, it is reflected in "the time required to uninstall". In this case, the number of times installed is plural, indicating that the computer resources for executing each business system are increased.

The software repository 126 has stored therein a software package used by the business system. The disk image repository 125, on the other hand, has stored therein the disk image of the active host used by the business system. The assignment/return script repository 124 has stored therein the script, for each OS type, executed at the time of building the standby host in the business system or returning the active host from the business system to the server pool 130. The script is executed on the OS corresponding to the business system by the script execution agent 132 (FIG. 1).

The management host 110 realizes seven functions including the business system addition, the business system deletion, the server resource addition, the server resource deletion, the host assignment, the host return and the group review. Each function is described below.

FIG. 8 shows the PAD (problem analysis diagram) of the business system add process 117. This PAD indicates the process of detecting the difference between the software constituting the business system added and the software constituting the host registered in the existing group management table 122 and reconstructing the group management table 122.

When accessing the business system add process 117, the business name, the constituent software list, the software package, the disk image, the assignment script and the return script are designated as an argument. The constituent software list is a list of the software used by the active hosts making up the business system and given in an arrangement corresponding to the order of installation. The software package is the install data used to install the software individually in the active host. The disk image is the total data of the disk contents at the time of constructing the business system on the active host. The assignment script is the process to be executed at the time of building the standby host in the business system. The return script is the process to be executed at the time of returning the active host from the business system to the server pool. The script is realized by a program.

In the software package registration step 801, the software package given as an argument is registered in the software repository 126. In the disk image registration step 802, the disk image given as an argument is registered in the disk image repository 125 with the business name as a key. In the assignment script and return script registration step 803, on the other hand, the assignment script and the return script are registered in the assignment/return script repository 124 with the business name as a key.

Next, in the group creation step 804, a group (hereinafter referred to as the new business group) is created in which the ID is a business name, the business flag is true, the constituent software is absent, the host search path is absent and the derivative group is absent. In the group list update step 805, the IDs of all the groups are set in the variable group list. Then, the next job is repeated (806).

With regard to the group list, the step 808 for acquiring the constituent software of the host associated with the group and the step 809 for comparing the constituent software list are repeated (807). In the constituent software compare step 809, the constituent software of the host associated with a group is compared with the constituent software of the active host of the added business system in the order of installation. First, the group having the same OS is searched for.

In the case where a group is found with at least one coincident constituent software (810) and the software constituting the host of the group found (hereinafter referred to as the discovered group) is a subset of the constituent software of the active host of the business system added (811), then the next process is executed. In the case where the constituent software of the discovered group is the AP server 1 or the OS 1 and the constituent software of the active host of the business system added is the application A, the AP server 1 or the OS 1, for example, the discovered group is a subset.

Specifically, in the group list update step 812, the derivative group of the discovered group is stored in the group list. Also, by first executing the step 807 for repeating the process for the group list, the derivative group of the discovered group is searched for the next coincident group. In the process, the degree of coincidence is stored in the order of previous installation, and the group having a coincident continuation is searched for.

In the case where the constituent software of the discovered group is not a subset of the constituent software of the business system added, the existing group is required to be divided.

First, in the group creation step 813, a group making up the root of the existing group and the group associated with a new business system (hereinafter referred to as the root group) is created. In the process, the argument is such that the ID is a unique one, the business flag is false, the constituent software is the first coincident portion upon search in the order of installation of the constituent software of the discovered group and the constituent software of the added business system, the host search path is that of the discovered group and no derivative group is existent. In the step 814 for updating the constituent software of the discovered group, the portion of the constituent software of the discovered group which is coincident with the constituent software of the added business system is deleted. In the next group creation step 815, a group (hereinafter referred to as the new group) is created in which the ID is a unique one, the business flag is false, the constituent software is that of the added business system which fails to coincide with the constituent software of the discovered group, the host conversion search path is the ID of the root group and the derivative group is that of the business names.

In the step 816 for updating the group derived from the root group, the IDs of the discovered group and the new group are set in the group derived from the root group. In the step 817 for updating the host search path of the discovered group, the root group is set in the host search path of the discovered group. In the step 818 for updating the host search path of the new business group, on the other hand, the ID of the new group is set in the host search path of the new business group. Then, the repetition of this process is left (819).

In the case where a group with at least one coincident constituent software fails to be found, an independent group including all the constituent software of the added business system is created in the group creating step 820 by designating such an argument that the ID is a unique one, the business flag is false, the constituent software is the difference between the constituent software of the group thus far discovered and the constituent software of the business system added, the host search path is the last discovered group and the derivative group is a new business group. Then, this process is left (821).

FIG. 9 shows the PAD of the business system delete process 118. This PAD represents the process of deleting the business system and the host existent due to the existence of the particular business system from the group management table 122.

The business system delete process 118 has a business name as an argument. First, the business name is stored as an ID in the ID update step 901. Then, the next process is repeated (902).

In the step 903 for acquiring the host search path from the group indicated by the ID, the host search path is acquired. In the step 904 for deleting the ID from the group derived from the group indicated by the host search path, the ID is deleted from the group derived from the group corresponding to the host search path. In the step 905 for acquiring the list of the hosts and IP of the group indicated by the ID, the hosts are held temporarily. The list of the hosts held is added anew to the server pool using the server resource add process 115. In the step 906 for deleting the group indicated by the ID, the host of the particular ID is deleted. In the ID update step 907, the host search path is set in the ID. In the case where the ID is 0 (908), the repetition is left (909). In the step 910 for acquiring the group derived from the group indicated by the ID, the derivative group is acquired. In the case where there are two or more derivative groups (911), the repetition is left (912).

In the case where there is only one derivative group (913), on the other hand, the groups divided are unified. In the step 914 for updating the constituent software of the derivative group, the constituent software of the group indicated by the ID is added to the constituent software of the derivative group. In the step 915 for updating the host search path of the derivative group, the host search path of the group indicated by the ID is set in the host search path of the derivative group. In the step 916 for updating the group derived from the group indicated by the host search path of the group indicated by the ID, the group derived from the group indicated by the ID is set in the group derived from the group indicated by the host search path of the group indicated by the ID. In the step 917 for acquiring the list of the hosts and the IPs of the group indicated by the ID, the list of the hosts is acquired. In the server resource add process 115, the acquired host is added again to the server pool. In the step 918 for deleting the group indicated by the ID, the group is deleted and the repetition is left (919).

Figure 10:
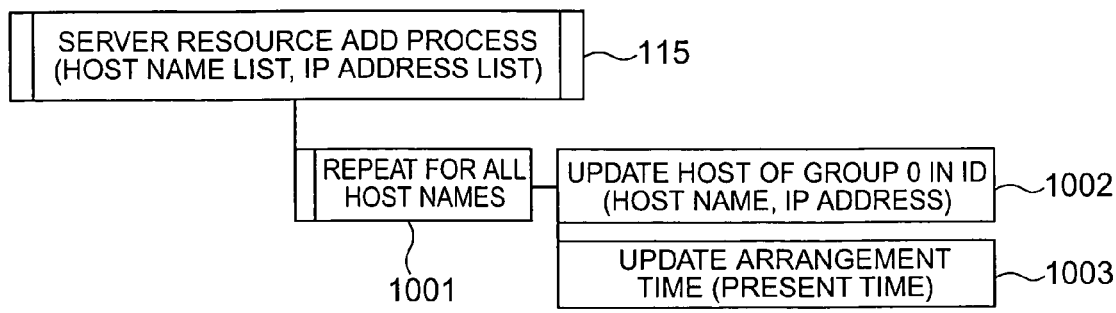
FIG. 10 shows the PAD of a server resource add process of FIG. 1.

FIG. 10 shows the PAD of the server resource add process 115. This PAD represents the process of registering a plurality of standby hosts 300 anew in the server pool 130. As an argument, the list of host names and the list of IP addresses are acquired. The host added is required to be connected physically to the network in advance. According to this embodiment, the host name and the IP address are appropriately set in the host added and connected to the port of the network switch 440 with the LAN cable. The server resource add function is to acquire the list of host names and the list of IP addresses as an argument. The next job is repeated for all the host names (1001).

In the step 1002 for updating the hosts of the group having the ID of 0, the host designated by the IP address is added. In the arrangement time update step 1003, the present time is set as the time of arrangement of the added host.

Figure 11:
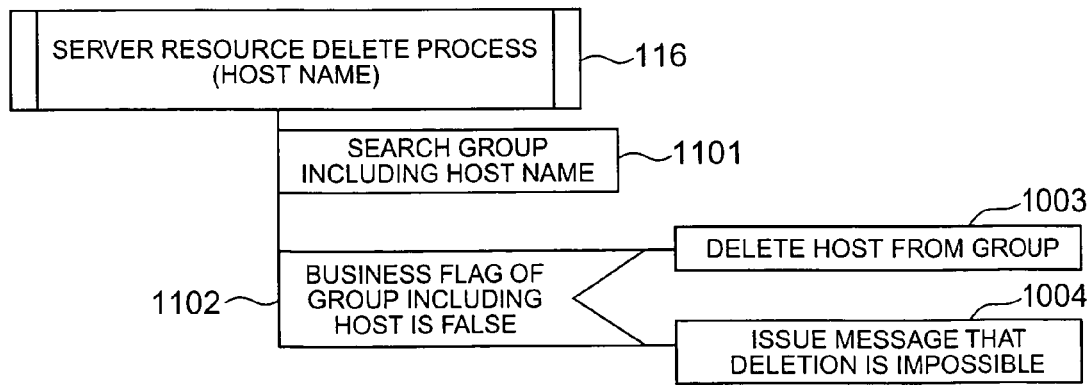
FIG. 11 shows the PAD of a server resource delete process of FIG. 1.

FIG. 11 shows the PAD of the server resource delete process 116. This PAD represents the process of deleting the standby host 300 registered in the server pool 130. As an argument, the host name is designated. In the step 1101 for searching the group including the host name, the group including the host name delivered with an argument is searched for, and in the case where the business flag of the group including the host is false (1102), the designated host is deleted from the group found in the step 1103 for deleting the host from the group. Unless the business flag is false, a message that deletion is impossible is issued (1104).

Figure 12:
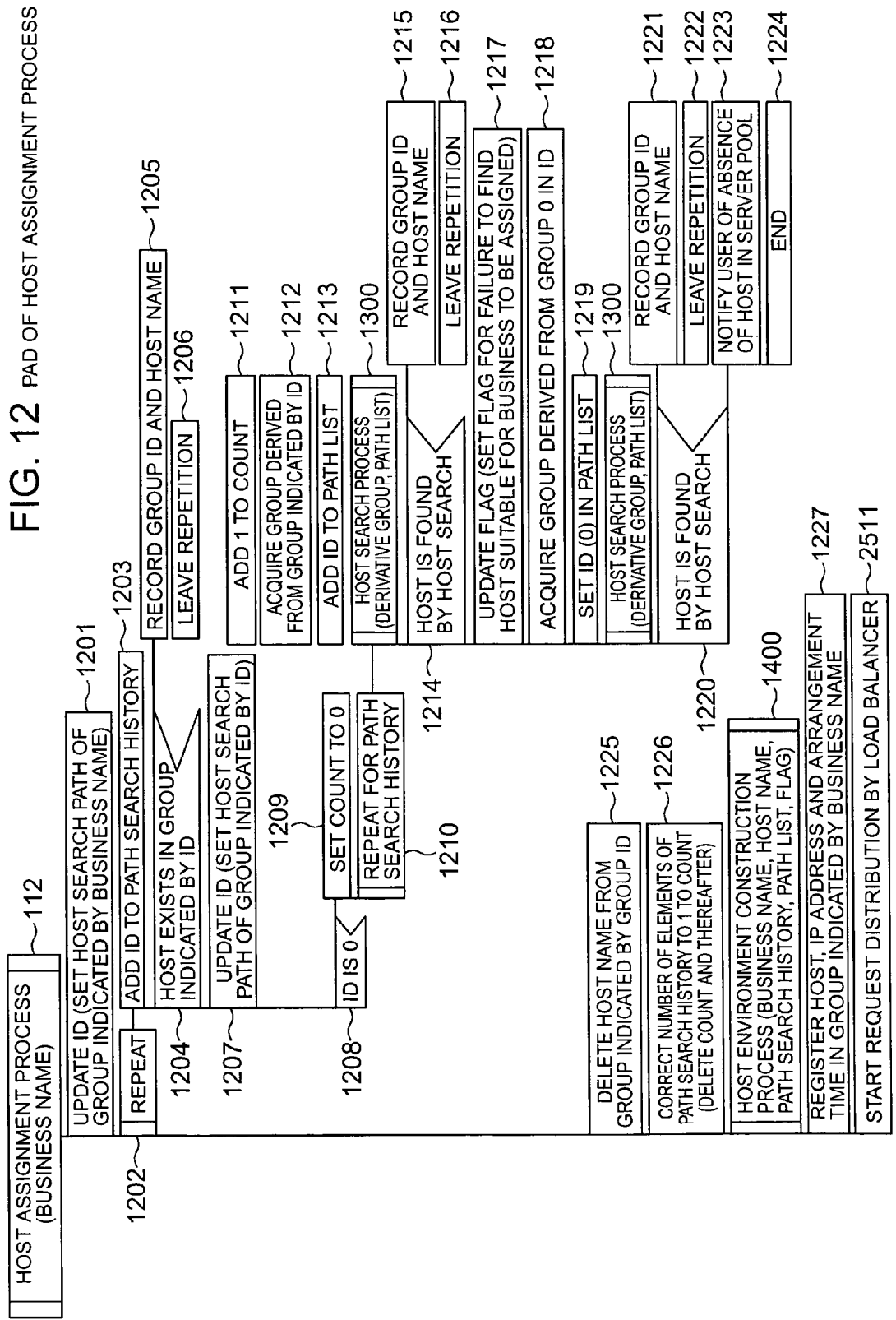
FIG. 12 shows the PAD of a host assignment process 112 of FIG. 1.

FIG. 12 shows the PAD of the host assignment process 112. This PAD represents the process of searching the server pool 130 for the standby host capable of being built in the business at the earliest time, constructing the software environment of the host 300 found and assigning it to the business system. As an argument, the business name is designated.

First, in the ID update step 1201, the host search path of the group indicated by the business name is set in the ID. Then, the next job is repeated (1202).

In the step 1203 for adding the ID to the path search history, the ID is added to the variable path search history. In the case where a host exists in the group indicated by the ID (1204), the group ID and the host name found in the step 1205 for recording the group ID and the host name are held, and the repetition is left (1206). In the ID update step 1207, the host search path of the group indicated by the ID is set in the ID.

In the case where the ID is 0 (1208), the step 1209 for setting the count to 0 is executed. The process is repeated for the path search history (1210).

The step 1211 for adding 1 to the count is executed. In the step 1212 for acquiring the group derived from the group indicated by the ID, the derivative group is acquired. In the step 1213 for adding the ID to the path list, the ID value is added to the variable path list, and the derivative group and the path list are designated and accessed as an argument of the host search process 1300. In the case where a host is found (1214) as the result of host search, the group and the host name associated with the host found in the step 1215 for recording the group ID and the host name are held, and the repetition is left (1216).

In the case where no host is found, on the other hand, the fact that no application host near to the assignee business system has not be found is recorded in the flag update step 1217. Then, in the step 1218 for acquiring the group derived from the group having the ID of 0, the derivative group 0 is acquired, and in the step 1219 for setting the ID (0) in the path list, the ID is set in the path list.

The host search process 1300 is executed by designating the derivative group and the path list as an argument. In the case where the host is found (1220) as the result of host search, the group ID and the host name associated with the host found are held in the step 1221 for recording the group ID and the host name. Then, the repetition is left (1222). In the case where no host is found, on the other hand, the absence of the host in the server pool is notified to the user (1223) and the process is ended (1224).

Once the host is found and the loop is left, the host name is deleted from the group indicated by the group ID in the step 1225 for deleting the host name from the group indicated by the group ID. In the step for correcting the number of elements of the path search history to 1 to count, the history retrieved only during the host search is created (the count and subsequent process are deleted from the path search history). The host environment construction process 1400 is started by designating the business name, the host name, the path search history, the path list and the flag as an argument.

The host, the IP address and the arrangement time are registered (1227) in the group indicated by the business name in the group management table 122.

Finally, in the step 2511 for starting the distribution of the request by the load balancer, the IP address of the added host 300 is added to the real IP 433 corresponding to the virtual IP 432 (in load balancer 430) which corresponds to the business system to which the server pool management system has added a host 300.

Figure 13:
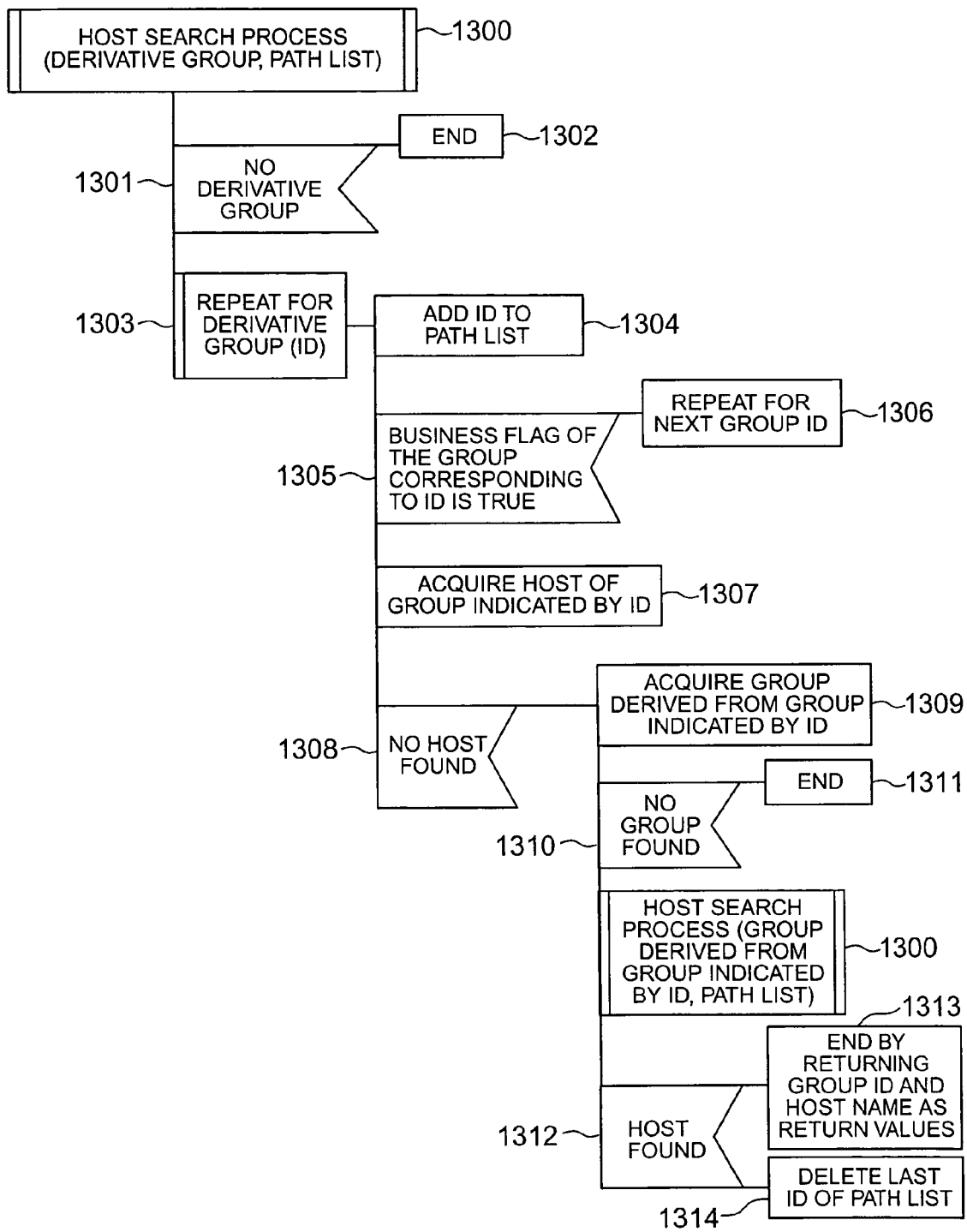
FIG. 13 shows the PAD of a host search process 1300.

FIG. 13 shows the PAD of the host search process. This PAD represents the process of retrieving the server adapted to be built in the business system at the earliest time by tracking the derivative group list reversely upon failure to find the host by tracking the host search path 604. This is used in the host assignment process 112. As an argument, the derivative group and the path list are designated. In the absence of the derivative group (1301), the process is ended (1302). For the derivative group (ID), the next process is repeated (1303).

The step of adding the ID to the path list is executed (1304). In the case where the business flag of the group corresponding to the ID is true (1305), the process is repeated for the next group ID. The step 1307 for acquiring the host of the group indicated by the ID is executed, and in the case where no host is found (1308), the step 1309 for acquiring the group derived from the group indicated by the ID is executed, while in the case where no group is found (1310), the process is ended (1311).

The host search process 1300 is executed by designating the group derived from the group indicated by the ID and the path list as an argument. In the case where the host is found (1312), the group ID and the host name are returned as a return value and the process is ended (1313). In the case where the host is not found, on the other hand, the step 1314 for deleting the last ID of the path list is executed.

Figure 14:
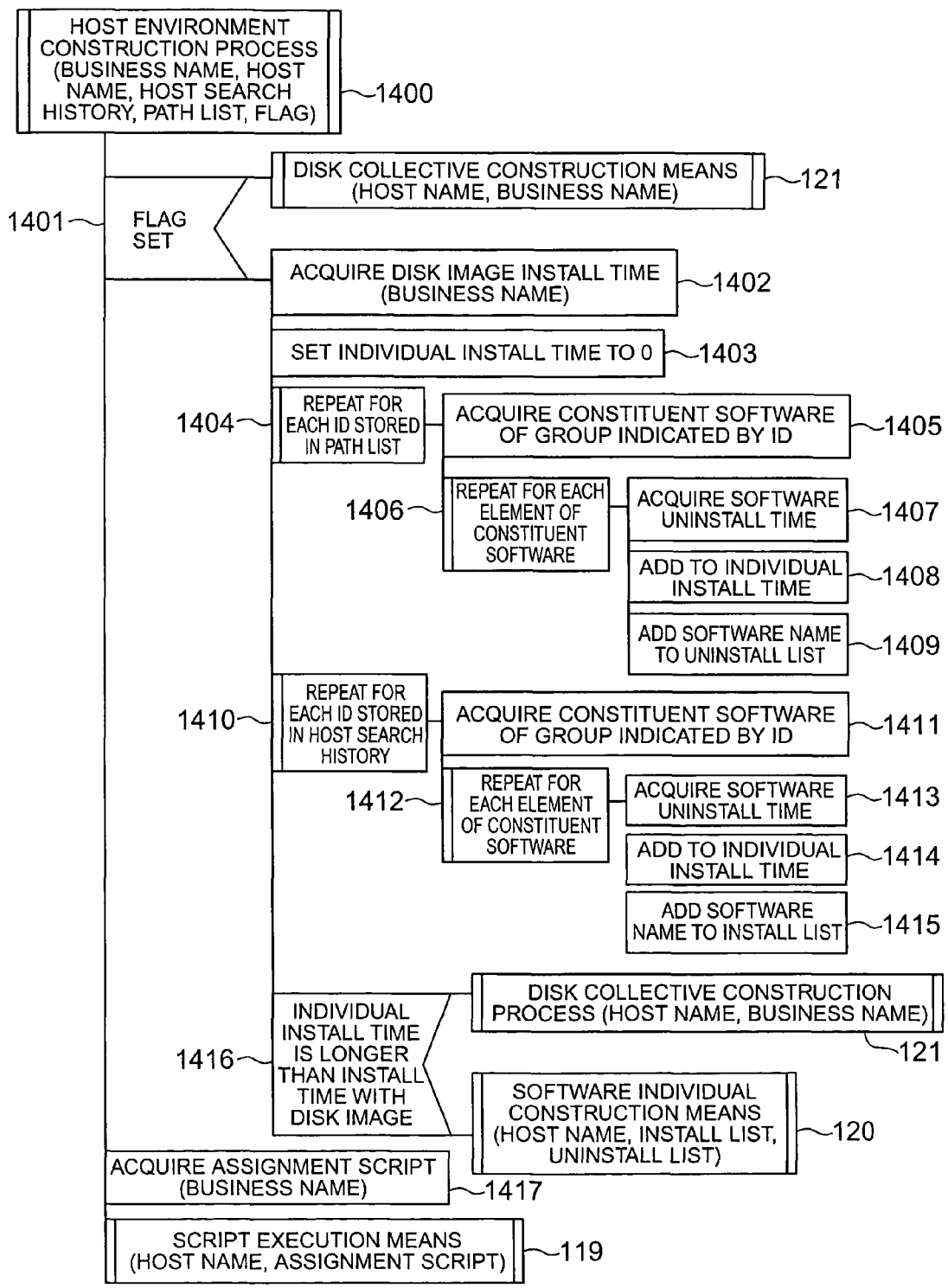
FIG. 14 shows the PAD of a host environment construction process 1400.

FIG. 14 shows the PAD of the host environment construction process. This PAD indicates the process of constructing the software environment for the host 300 found from the server pool 130 to be built in the business. Using the environment construction average time management table, the process capable of constructing the software environment at the earliest time is selected, and according to this method, the software environment of the host 300 is prepared. This process is used in the host assignment process 112. In the case under consideration, with reference to the environment construction average time management table 123, the time required for software individual installation is calculated. This time is compared with the time required for installation with the disk image, and the shorter time is selected to construct the software environment.

In the case where a flag is set which indicates that the host simply repeating the installation and uninstllation and capable of being built in the business (1401) is not found at all, the disk collective construction means 121 is accessed by designating the host name and the business name as an argument. In the disk collective construction means, the disk image corresponding to the business name is acquired from the disk image repository, and copied to the host. In the case where no flag is set, on the other hand, the time required for individual installation is calculated. In the step 1402 for acquiring the disk image installation time, the predicted time for construction with the disk image is acquired. In the step 1403 for setting 0 as the individual installation time, the variable is cleared.

The subsequent process is repeated for each ID stored in the path list (1404). In the step 1405 for acquiring the constituent software of the group indicated by the ID, the constituent software list is acquired and the subsequent process is repeated for each element of the constituent software acquired (1406).

In the software uninstall time acquisition step 1407, the average software uninstall time is acquired from the environment construction time management table 123, and the total is calculated in the step 1408 for adding to the individual installation time. Then, the step 1409 for adding the software name to the uninstall list is executed.

Next, the subsequent process is repeated for each ID stored in the host search history (1410). In the step 1411 for acquiring the constituent software of the group indicated by the ID, the constituent software list is acquired and the subsequent process is repeated for each element of the constituent software acquired (1412). In the step 1413 for acquiring the software uninstall time, the average software uninstall time is acquired from the environment construction time management table 123, and the total is calculated in the step 1414 for adding to the individual install time. Then, the step 1415 for adding the software name to the install list is executed.

In the case where the time for individual installation is longer than the time for installation with the disk image (1416), the disk collective construction means 121 is accessed by designating the host name and the business name as an argument. In the case where the time for individual installation is shorter than the time for installation with the disk image, on the other hand, the software individual construction means 120 is accessed with the host name, the install software list and the uninstall list as an argument.

Finally, in the assignment script acquisition step 1417, the assignment script corresponding to the business name is acquired from the assignment/return script repository 124, and the acquired script is executed by the script execution means 119. Upon execution of the software individual construction means 120 and the disk collective environment construction means 121, the average time of the environment construction average time management table 123 is updated.

Figure 15:
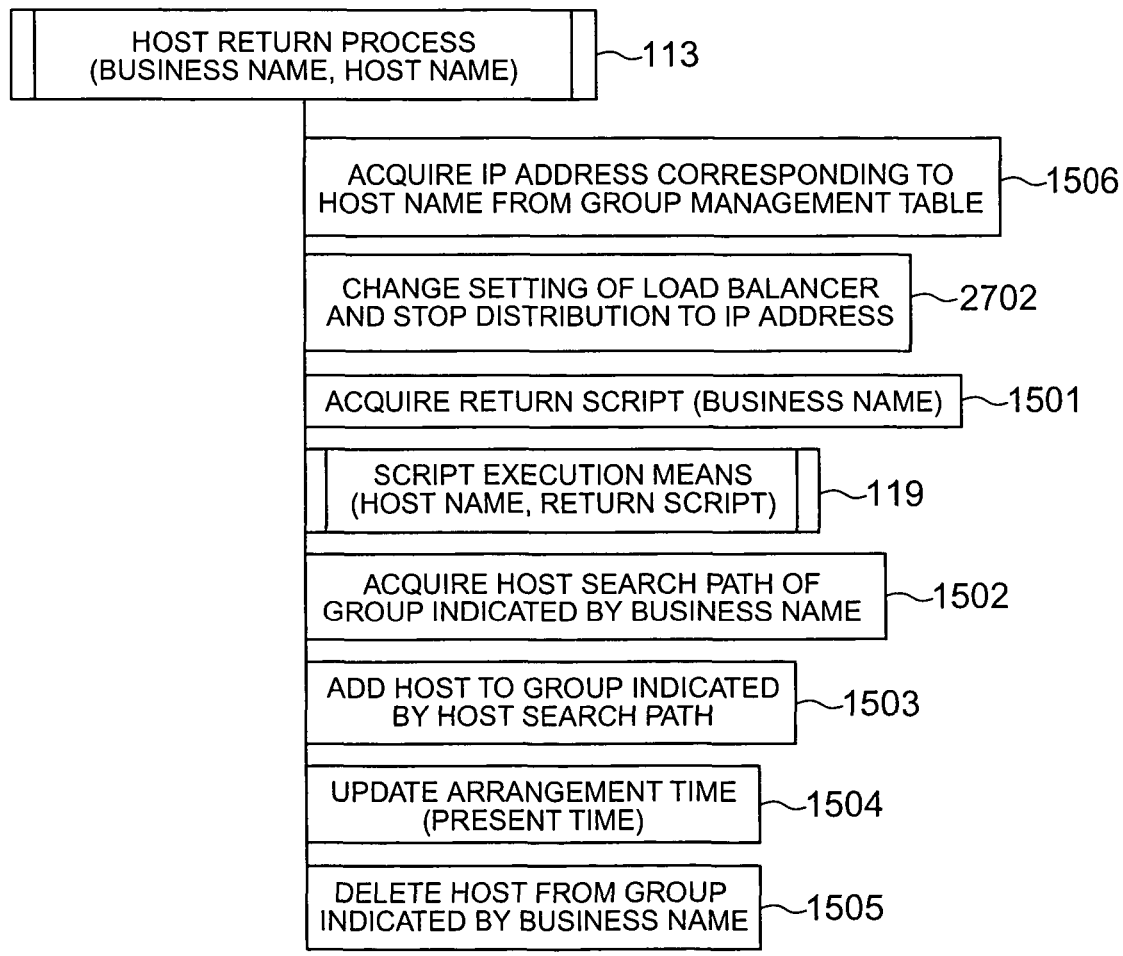
FIG. 15 shows the PAD of a host return process 113.

FIG. 15 shows the PAD of the host return process 113. This PAD represents the process of returning the host 300 thus far built in the business system to the server pool 130. The host thus returned is registered in the group having the same constituent software as that of the particular business system. The business name and the host name are designated as an argument.

In the return script acquisition step 1501, in order to first stop the distribution by the load balancer 430, the IP address corresponding to the host name is acquired from the group management table (1506). Then, the setting of the load balancer is changed and the distribution to the IP address is stopped (2702).

In the return script acquisition step 1501, the return script corresponding to the business name is acquired from the assignment/return script repository 124. In the script execution means 119, the return script is executed. The step 1502 for acquiring the host search path of the group indicated by the business name is executed, and in the step 1503 for adding the host to the group indicated by the host search path, the host to be returned is registered. Also, the time (present time) at which the host is returned is recorded in the arrangement time update step 1504. The step 1505 for deleting the host from the group indicated by the business name is executed and the process is ended.

Figure 16:
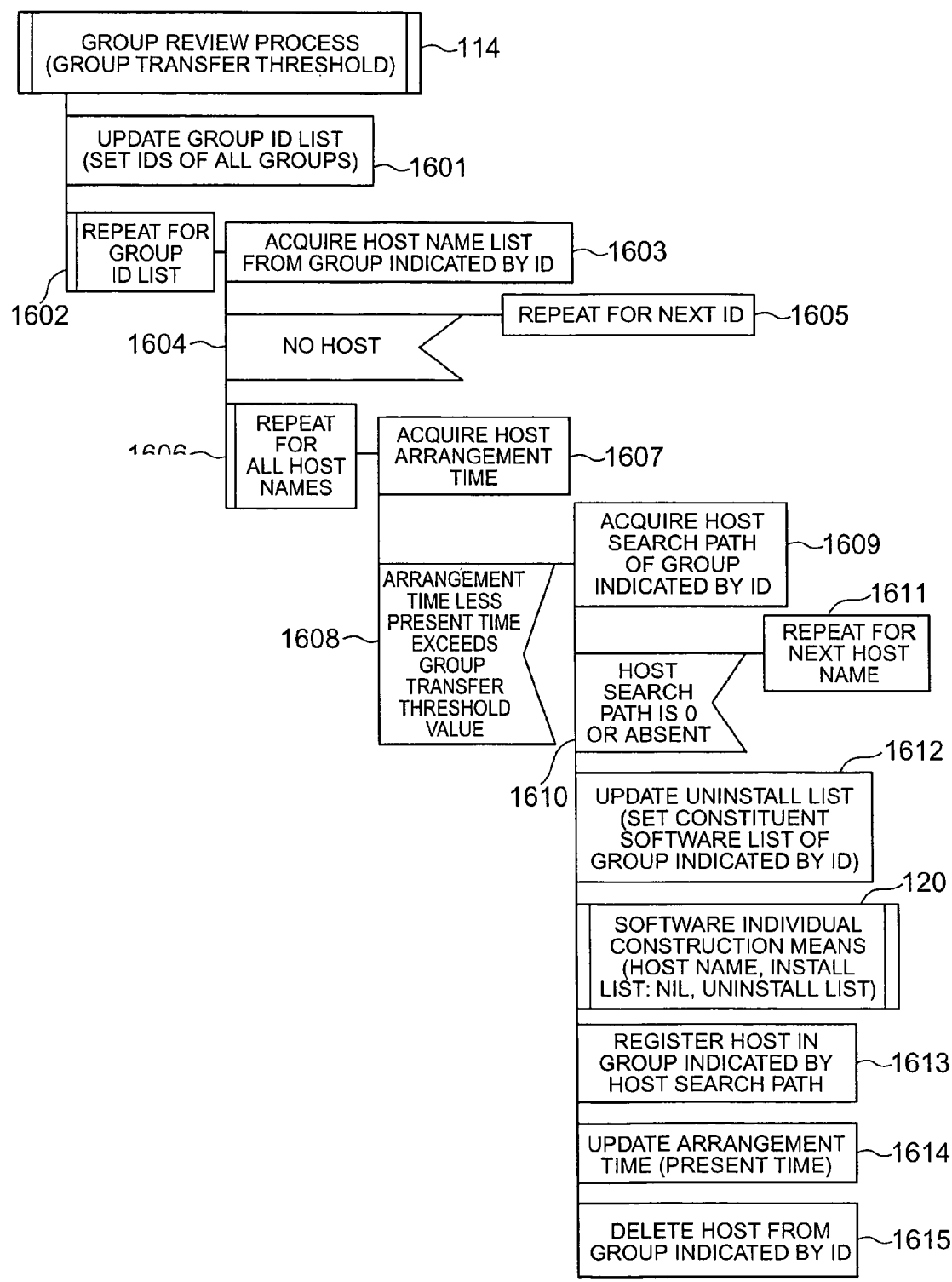
FIG. 16 shows the PAD of a group review process 114.

FIG. 16 shows the PAD of the group review process 114. This PAD represents the process in which the arrangement time of the group management table 122 is accessed, and in the case where a given host 300 remains associated with the server pool for a long time, the host 300 is transferred to the host group having a wider application. When transferring the host 300 to another group, the software is appropriately installed. The group transfer threshold value is designated as an argument.

In the group ID list update step 1601, the IDs of all the groups are set in the group ID list. The process is repeated for the group ID list (1602).

The step 1603 for acquiring the host name list from the group indicated by the ID is executed. In the absence of a host (1604), the process is repeated for the next ID (1605). The subsequent process is repeated for all the host names (1606). The host arrangement time acquisition step 1607 is executed. In the case where the arrangement time less the present time exceeds the group transfer threshold value (1608), the step 1609 for acquiring the host search path of the group indicated by the ID is executed.

In the case where the host search path is 0 or absent (1610), the process is repeated for the next host name (1611). In the uninstall list update step 1612, the list of the constituent software of the group indicated by the ID is set in the uninstall list. In the software individual construction means 120, the software of the uninstall list is uninstalled. In the step 1613 for registering the host in the group indicated by the host search path, the group is transferred. In the arrangement time update step 1614, the present time is recorded as the arrangement time. The step 1615 for deleting the host from the group indicated by the ID is executed.

In FIG. 16, the group is reviewed with time as a threshold. Without using time, however, preparations may be made against an unexpected load which may be imposed on the business system A 221. Specifically, in the case where the order of priority of the business system A 221 in FIG. 2 is high, for example, and the number of the hosts 300 associated with the SP group (201) is decreased below a predetermined threshold value, then the hosts 300 associated with the SP group 3 (203) are transferred to the SP group 4 (204) or the unbusy hosts 300 are transferred to the SP group 1 (201).

As long as the load can be predicted, on the other hand, the user may manually instruct the hosts 300 to transfer between the groups. For example, the command line interface is used for instructions, or the graphical user interface making it possible to grasp the number of hosts associated with each group in the server pool is provided to transfer the icon of the host 300 over the groups by mouse.

Second Embodiment

Each host is so configured as not to include, or if included, not to use the HDD. The logic unit (LU) included in the storage is used as the HDD of the host, and the host is started using the LU. In this configuration, a method of searching for the LU most quickly assignable to the business system is explained below. According to this embodiment, the server pool 130 includes the LU, i.e. the SP groups 0 to 4 shown in FIG. 2 include the LU.

Figure 17:
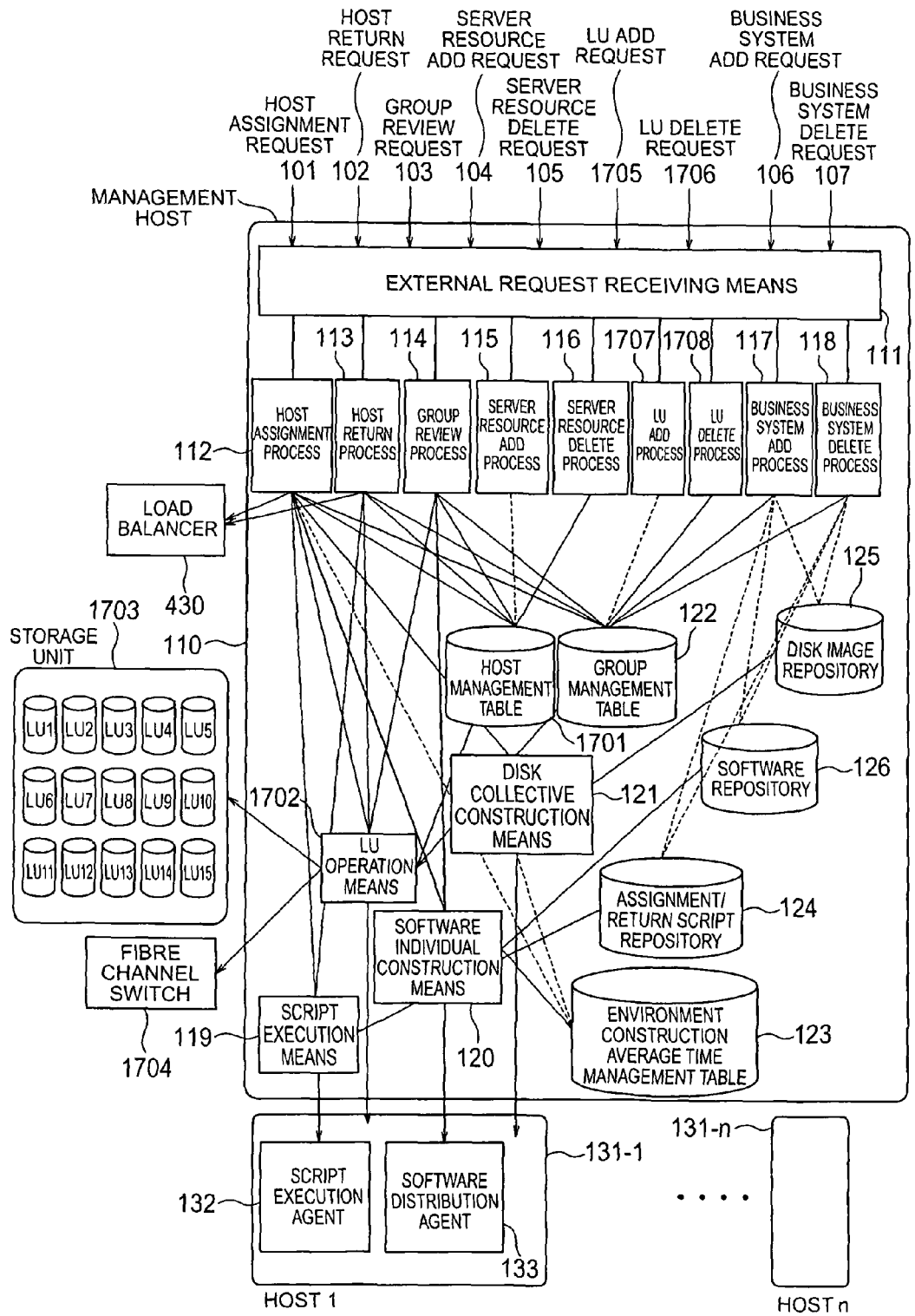
FIG. 17 is a diagram showing a configuration of an information system built around a management host 110 using a storage.

FIG. 17 is a diagram showing a system configuration. As compared with the first embodiment, this system additionally includes a host management table 1701, a LU operation means 1702, a LU add process 1707, a LU delete process 1708, a storage unit 1703 and a fibre channel switch 1704. The host management table 1701 manages as to which host 300 is busy and which host 300 is unbusy. The LU operation means 1702, operating the fibre channel switch 1704, assigns the LU to and makes available a specified host 300 or cancels the assignment of LU to and makes unavailable the host 300. The LU add process 1707 adds a new LU as an object to be managed, and the LU delete process 1708 removes the unrequired UL from management. Also, the script execution agent 132 and the software distribution agent 133, initially not existent in the hosts 300 but existent in the LU, can be activated after LU assignment to the host 300.

Figure 18:
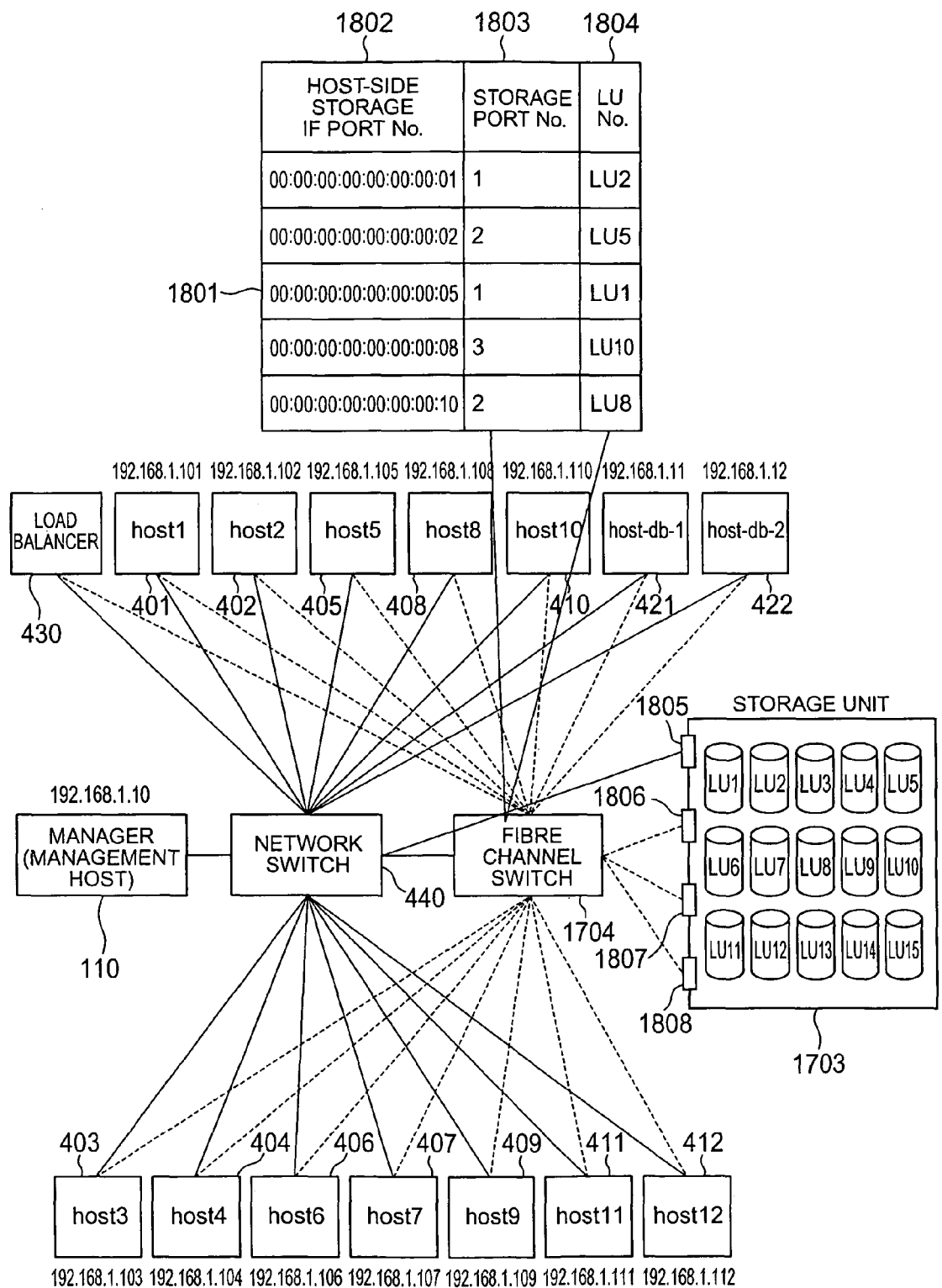
FIG. 18 is a diagram showing an example of the physical configuration of an information system for processing various business systems (including a storage).

FIG. 18 shows a physical configuration. The manager 110 is required to control the fibre channel switch 1704 and the storage unit 1703 anew, and therefore connects them through the network switch 440. The fibre channel switch 1704 is for connecting the storage unit 1703 and the hosts 401 to 412. The dashed lines in FIG. 18 indicate the fibre cables. A plurality of logic units (LU) providing a logic disk volume can be created in the storage unit 1703. According to this embodiment, 15 logic units including LU 1 to LU 15 are assumed to exist. The storage unit 1703 is assumed to have a management port 1805 and ports 1806 to 1808 for the fibre cables. The ports 1806 to 1808 for the fibre cables correspond to the storage port Nos. 1 to 3. The hosts 401 to 412 each have a storage IF built therein, and a number is attached to the port of each storage IF. In the fibre channel switch 1704, the hosts 401 to 412 and the LU used by each host are set in correspondence with each other. Table 1801 shows an example. On the uppermost line, for example, the host having the host-side storage IF port number 00:00:00:00:00:00:00:01, the storage port number 1 and LU 2 are set in correspondence with each other. According to this embodiment, each table has the host-side storage IF port number 1802, the storage port number 1803 and the LU number 1804. The fibre channel switch, however, has only the host-side storage port number 1802 and the storage port number 1804. The hosts 401 to 412 each have the LU number. At the time of giving a request to the storage unit 1703, the processing request including the LU number may be issued to the storage unit 1703.

FIG. 19 shows a group management table used for storage. Unlike in the group management table 122 in the first embodiment, the LU search path 1901, the LU number 1902 and the storage port number 1903 are newly managed. The host name 606 and the IP address 607, managed only when the business flag is true, indicate the name of the host assigned the LU and the IP address thereof. Also, in order to manage the hosts available for use, the host management table 1701 is used.

FIG. 20 shows an example of the host management table 1701. The host name 2001, the IP address 2002, the host-side storage IF port number 2003 and the usage 2004 are managed.

The process for realizing each function is explained below. The business system add process 117 and the business system delete process 18 are identical with those of the first embodiment.

Figure 21:
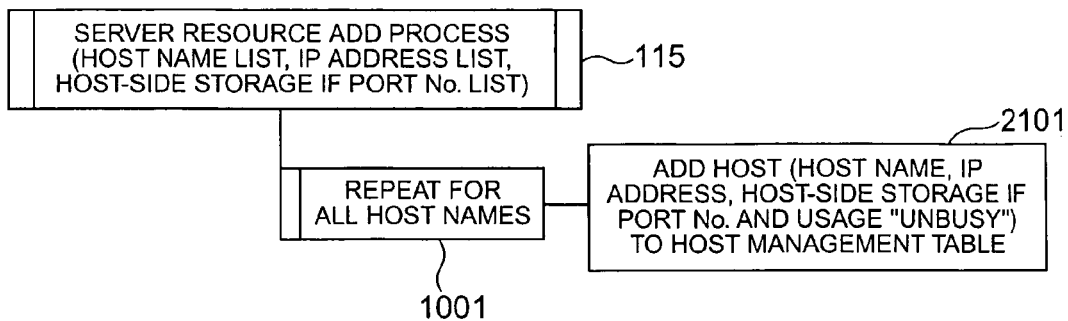
FIG. 21 shows the PAD of a server resource add process 115 of FIG. 17.

FIG. 21 shows the PAD of the server resource add process 115. The added host name list, the IP address list and the host-side storage IF port list are designated as an argument. For all the host names delivered as an argument, the step 2101 for adding the host (host name, IP address, host-side storage IF port number and "unbusy" as the usage) to the host management table is repeated (1001). According to this embodiment, a plurality of hosts can be collectively added. Nevertheless, only one host may of course be added.

Figure 22:
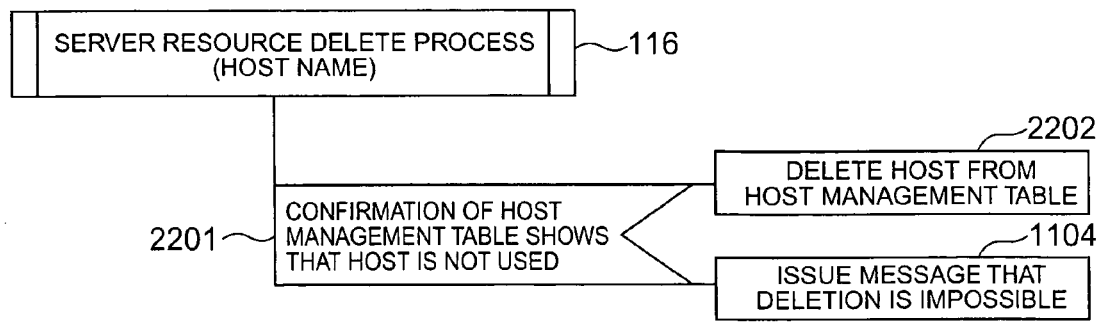
FIG. 22 shows the PAD of a server resource delete process 116 of FIG. 17.

FIG. 22 shows the PAD of the server resource delete process 116. The host name is designated as an argument. In the case where the result of confirmation of the host management table shows that a host is unbusy (2201), the step 2202 for deleting the host from the host management table is executed, and in the case where a host is busy, on the other hand, a message is issued to the effect that the deletion is impossible.

Figure 23:
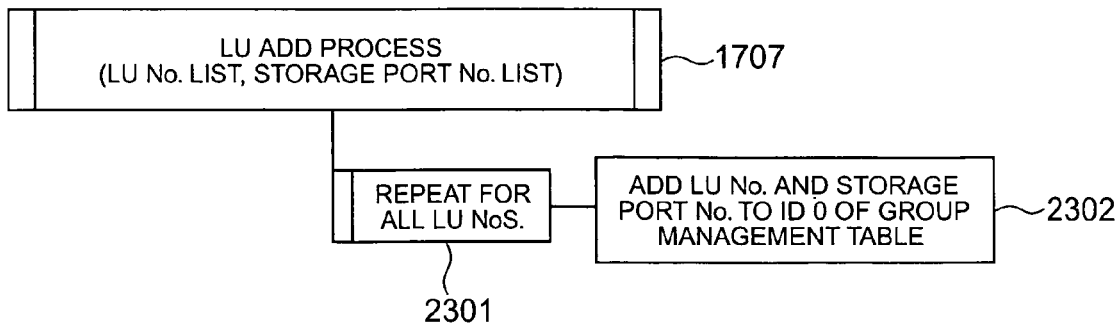
FIG. 23 shows the PAD of a LU (logic unit) add process 1707 of FIG. 17.

FIG. 23 shows the PAD of the LU add process 1707.

The LU number list and the storage port number list are designated as an argument. For all the LU numbers, the step 2302 for adding the LU number and the storage port number to the ID 0 of the group management table is repeated (2301). According to this embodiment, a plurality of LUs can be added collectively. Nevertheless, a single LU can of course be added at a time.

Figure 24:
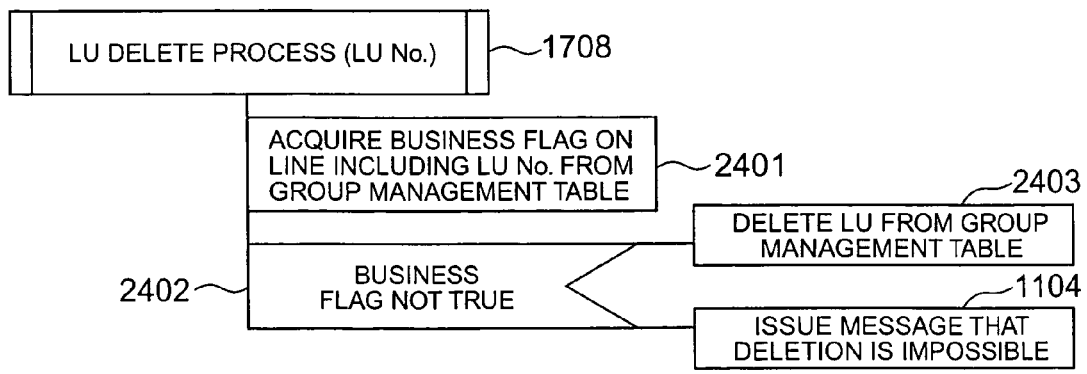
FIG. 24 shows the PAD of a LU delete process 1708 of FIG. 17.

FIG. 24 shows the PAD of the LU delete process 1708. The LU number is designated as an argument. In place of the LU number, the information by which the LU can be identified may be used. First, the business flag for the line containing the LU number is acquired from the group management table (2401). In the case where the business flag is not true (2401), the step 2403 for deleting the LU from the group management table is executed, while in the case where the business flag is true, a message is issued to the effect that the LU cannot be deleted (1104).

Figure 25:
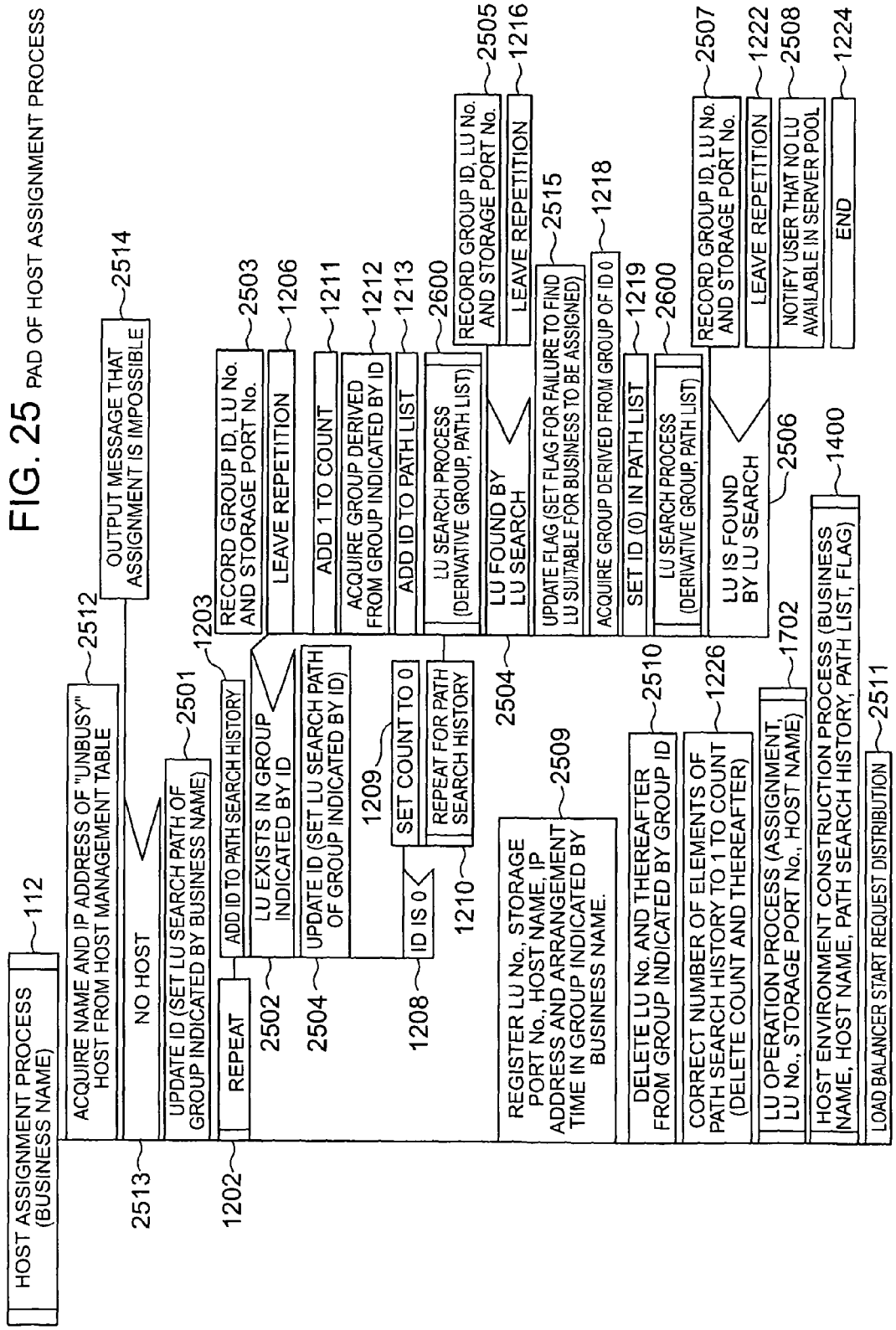
FIG. 25 shows the PAD of a host assignment process 112 of FIG. 17.

FIG. 25 shows the PAD of the host assignment process 112. This PAD indicates the process in which the LU that can be built in the business at the earliest time is retrieved and the found LU is assigned to the unbusy host 300, after which the software environment is constructed and assigned to the business system. The business name is designated as an argument.

First, the host name and the IP address of the host "unbusy" in usage is acquired from the host management table (2512). In the absence of the "unbusy" host (2513), a message that assignment is impossible is output (2514). In the ID update step 2501, the LU search path of the group indicated by the business name is set in the ID. Then, the subsequent job is repeated (1202).

In the step 1203 for adding the ID to the path search history, the ID is added to the variable path search history. In the case where the LU is existent in the group indicated by the ID (2502), the group ID, the LU number and the storage port number found in the step 2503 for recording the group ID, the LU number and the storage port number are held and the repetition is left (1206). In the ID update step 2504, the LU search path of the group indicated by the ID is set in the ID.

In the case where the ID is 0 (1208), the step 1209 for setting the count to 0 is executed. The process is repeated for the path search history (1210).

The step 1211 for adding 1 to the count is executed. In the step 1212 for acquiring the group derived from the group indicated by the ID, the derivative group is acquired, and in the step 1213 for adding the ID to the path list, the ID value is added to the variable path list, and the derivative group and the path list are designated and accessed as an argument of the LU search process 2600. In the case where the LU is found as the result of LU search (2504), the group associated with the LU, the LU number and the storage port number found in the step 2505 for recording the group ID, the LU number and the storage port number are held, and the repetition is left (1216).

In the case where no LU is found, the flag update step 251 records the fact that the LU near to the assignee business system could not be found. Then, in the step 1218 for acquiring the group derived from the group of ID 0, the derivative group of the group 0 is acquired. Also, in the step 1219 for setting ID (0) in the path list, the ID is set in the path list.

The LU search process 2600 is executed with the derivative group and the path list designated as an argument. In the case where the LU is found as the result of LU search (2506), the group ID associated with the found LU, the LU number and the storage port number are held in the step 2507 for recording the group ID, the LU number and the storage port number, and the repetition is left (1222). In the case where on host is found, on the other hand, the absence of the available LU in the server pool is notified to the user (2508), and the process is ended (1224).

In the case where the LU is found and the loop is left, the LU number, the storage port number, the host name, the IP address and the arrangement time are registered in the group indicated by the business name (2509). The LU number, the storage port number and the arrangement time are deleted from the group indicated by the group ID in the step 2510 for deleting the cell of the LU number and right cells from the group indicated by the group ID in the group management table. In the step 1226 for correcting the number of elements of the path search history to 1 to count, the history to the extent retrieved during the host search is created (the count and subsequent count are deleted from the path search history). By accessing the LU operation process 1702 with the assignment (command), the LU number, the storage port number and the host name as an argument, the LU is made available from the host 300 indicated by the host name.

The host environment construction process 1400 is started by designating the business name, the host name, the path search history, the path list and the flag as an argument. Once a state is realized in which the business can be performed upon complete construction of the environment of the host 300, the setting of the load balancer 430 is changed for distribution of the business request to the constructed host in the step 2511 for starting the request distribution by the load balancer.

Figure 26:
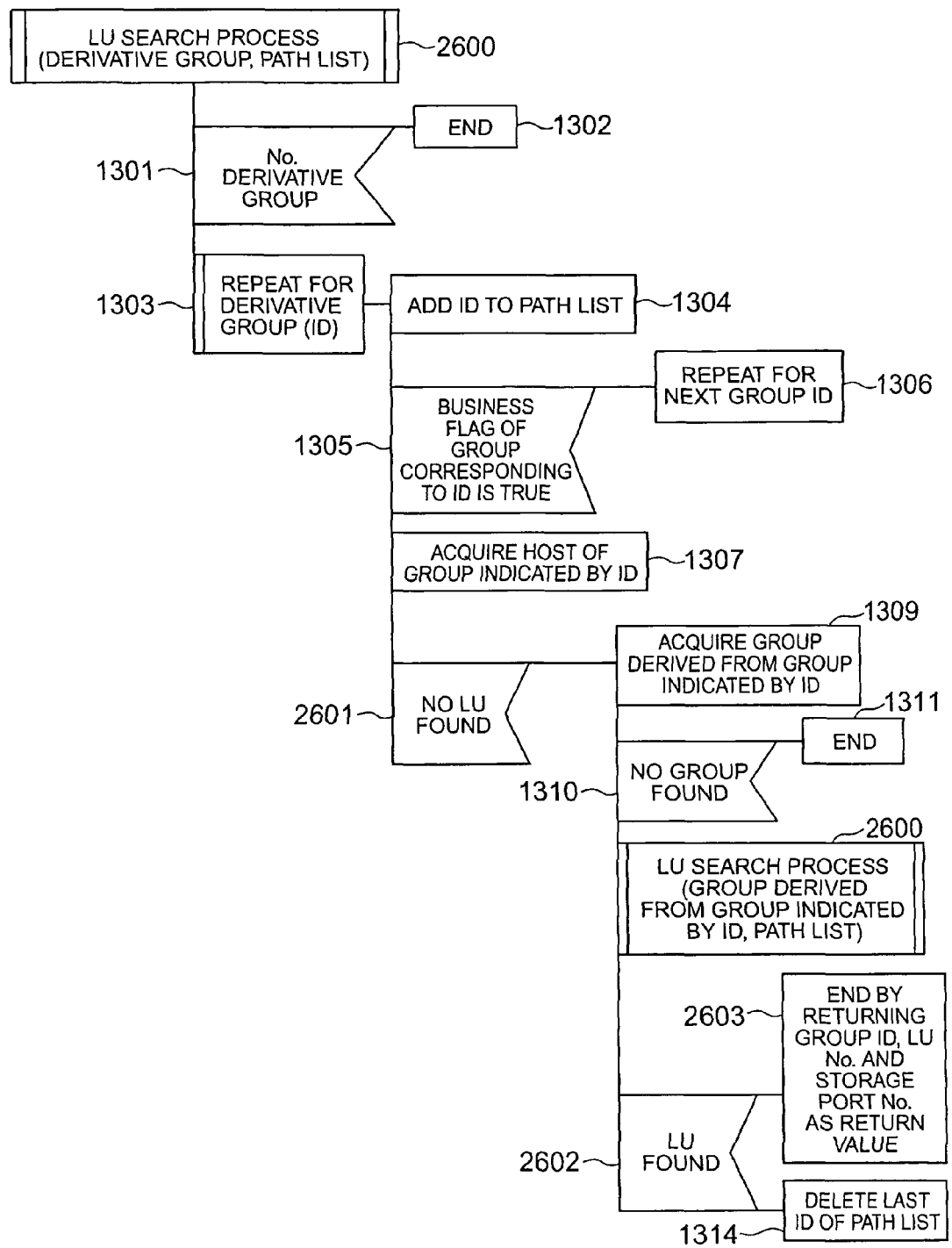
FIG. 26 shows the PAD of a LU search process.

FIG. 26 shows the PAD of the LU search process 2600. This PAD represents the process in which in the case where the LU cannot be found by tracking the LU search path 1901, the derivative group list 605 is tracked reversely thereby to retrieve the LU that can be built in the business system at the earliest time. The host assignment process 112 is used. As an argument, the derivative group and the path list are designated. In the absence of a derivative group (1301), the process is ended (1302). The next process is repeated for the derivative group (ID) (1303).

The step 1304 for adding the ID to the path list is executed. In the case where the business flag of the group corresponding to the ID is true (1305), the process is repeated for the next group ID. The step 1307 for acquiring the host of the group indicated by the ID is executed, and in the case where the LU fails to be found (2601), the step 1309 for acquiring the group derived from the group indicated by the ID is executed. In the case where no group is found (1310), the process is ended (1311).

The LU search process 2600 is executed by designating, as an argument, the group derived from the group indicated by the ID and the path list. In the case where the LU is found (2602), on the other hand, the group ID, the LU number and the storage port number are returned as a return value and the process is ended (2603). In the case where no host is found, the step 1314 for deleting the last ID of the path list is executed.

Figure 27:
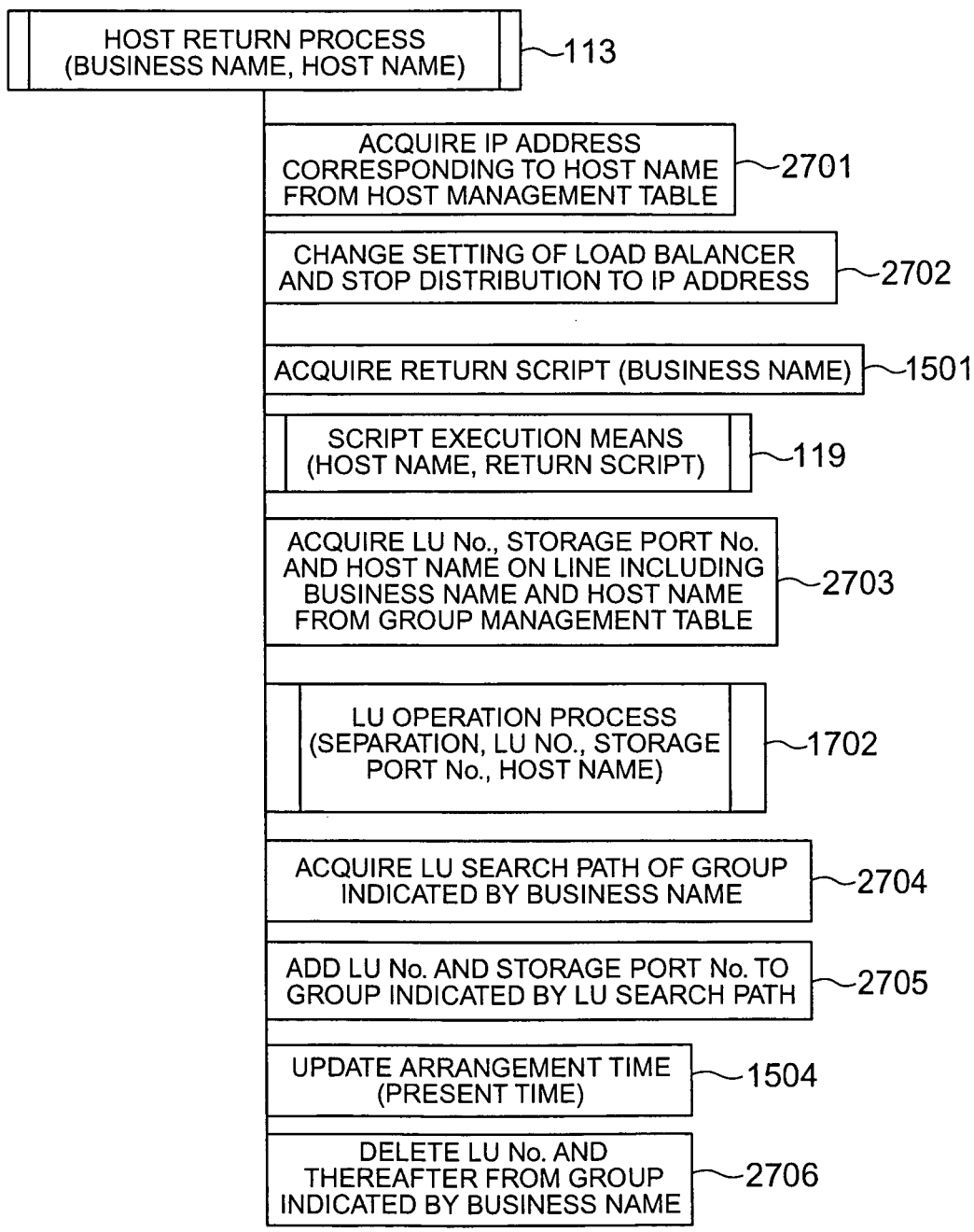
FIG. 27 shows the PAD of a host return process 113 of FIG. 17.

FIG. 27 shows the PAD of the host return process 113. This PAD represents the process in which the host 300 built in the business system is separated into the LU and the host 300, and the LU is returned to the server pool 130. The host thus returned is registered in the group having the same constituent software as the business system. The business name and the host name are designated as an argument.

First, the IP address corresponding to the host name is acquired from the host management table (2701). By changing the setting of the load balancer, the distribution to the IP address is stopped (2702). In the return script acquisition step 1501, the return script corresponding to the business name is acquired from the assignment/return script repository 124. In the script execution means 119, the return script is executed. From the group management table, the LU number, the storage port number and the host name of the line containing the business name and the host name are acquired (2703). With the separation (command), the LU number, the storage port number and the host name as an argument, the LU operation process 1702 is accessed thereby to separate the host 300 and the LU. The step 2704 for acquiring the LU search path of the group indicated by the business name is executed, and in the step 2705 for adding the LU number and the storage port number to the group indicated by the LU search path, the host to be returned is registered. Also, in the arrangement time update step 1504, the time when the host is returned (present time) is recorded. The step 2706 for deleting the LU number and subsequent numbers from the group indicated by the business name is executed, and the process is ended.

Figure 28:
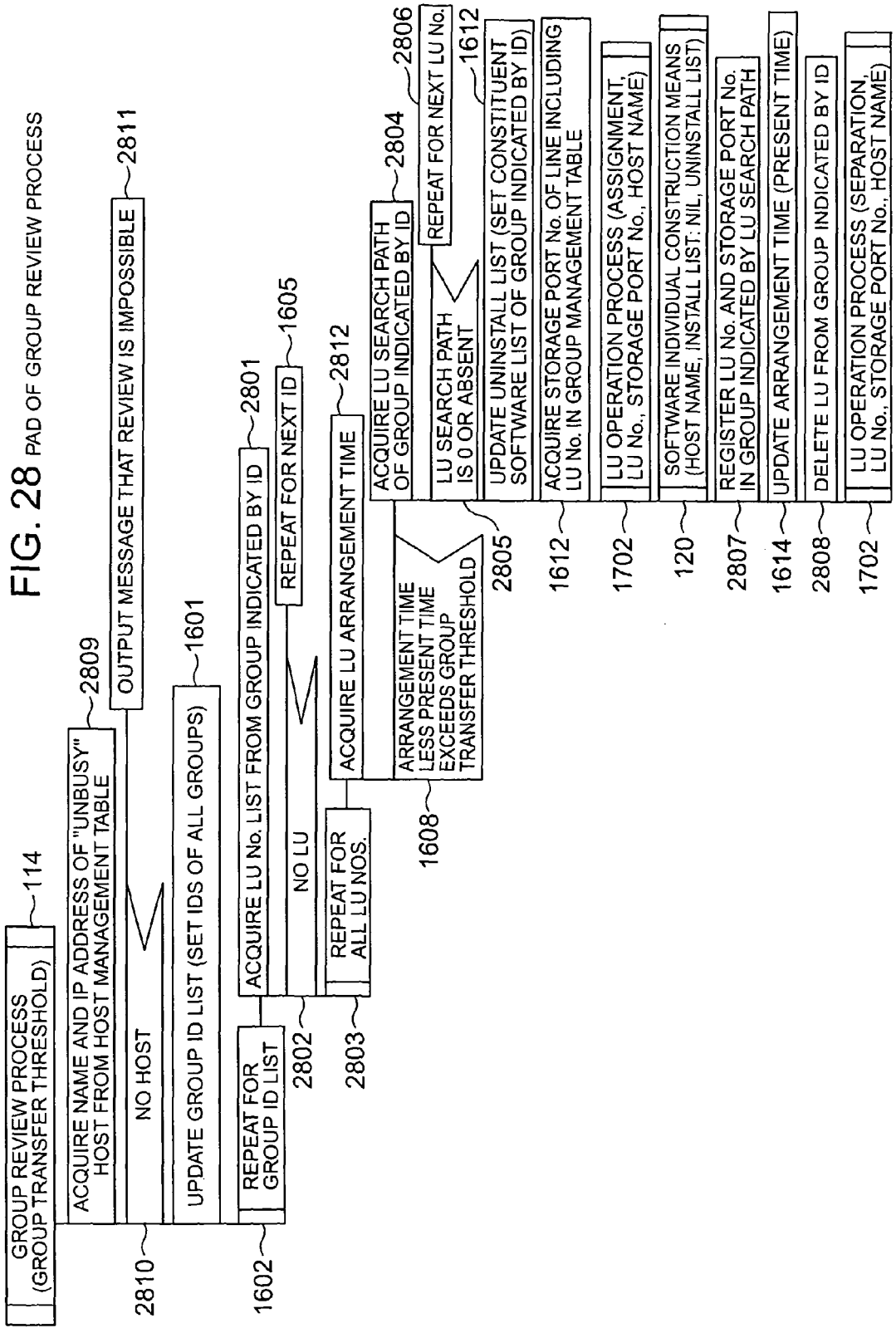
FIG. 28 shows the PAD of a group review process 114 of FIG. 17.

FIG. 28 shows the PAD of the group review process 114. This PAD represents the process in which the arrangement time of the group management table 122 is accessed, and a LU, if remaining associated with the server pool for a long time, is transferred to a host group having a wider application. The LU, when transferring the group, is assigned to the host 300 and the software is uninstalled appropriately. The group transfer threshold value is designated as an argument.

From the host management table, the host name of the "unbusy" host and the IP address are acquired (2809). In the absence of an "unbusy" host (2810), a message that the review is impossible is output (2811).

In the group ID list update step 1601, the IDs of all the groups are set in the group ID list. The next process is repeated for the group ID list (1602).

The step 2801 for acquiring the LU number list from the group indicated by the ID is executed. In the absence of the LU (2803), the process is repeated for the next ID (1605). The next process is repeated for all the LU numbers (1606). The LU arrangement time acquisition step 2812 is executed. In the case where the arrangement time less the present time exceeds the group transfer threshold value (1608), the step 2804 for acquiring the LU search path of the group indicated by the ID is executed.

In the case where the LU search path is 0 or absent (2805), the process is repeated for the next LU number (2806). In the uninstall list update step 1612, the constituent software list of the group indicated by the ID is set in the uninstall list. By accessing the LU operation process 1702 with the assignment (command), the LU number, the storage port number and the host name as an argument, the LU of the LU number is assigned to the host 300 having the host name. In the software individual construction means 120, the software in the uninstall list is uninstalled. The LU number and the storage port number are registered in the group indicated by the LU search path (2807) and the group is transferred. In the arrangement time update step 1614, the present time is recorded as the arrangement time. The step 2808 for deleting the LU from the group indicated by the ID is executed. By accessing the LU operation process with the separation (command), the LU number, the storage port number and the host name as an argument, the host 300 and the LU are separated.

Figure 29:
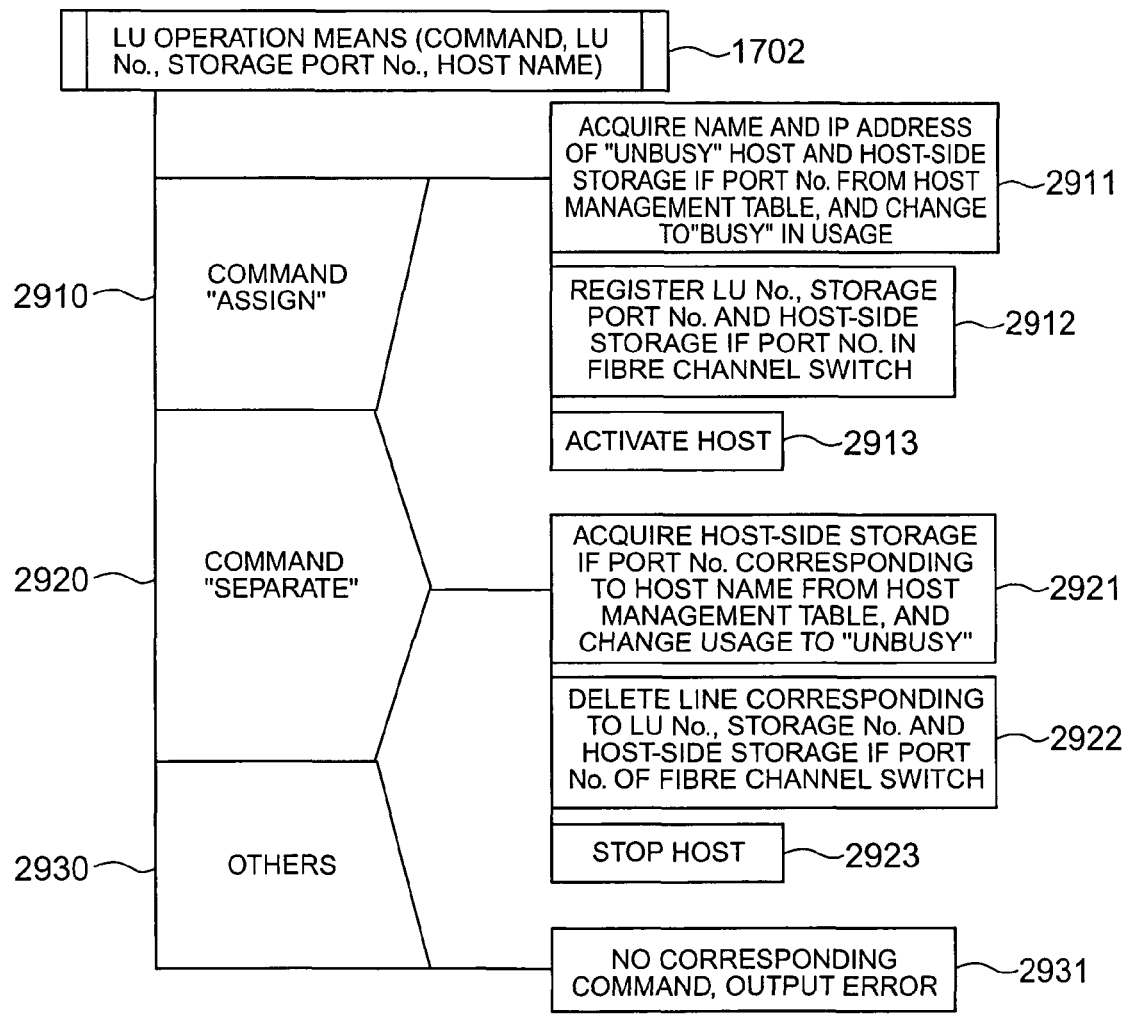
FIG. 29 shows the PAD of a LU operation means 1702 shown in FIG. 17.

FIG. 29 shows the PAD of the LU operation process 1702. In the LU operation process 1702, the assignment to make the LU available for the host or the separation to make the LU unavailable for the host is executed in accordance with the command of an argument. The command, the LU number, the storage port number and the host name are designated as an argument.

In the case where the command is "assignment" (2910), the host name and the IP address of the "unbusy" host and the host-side storage IF port number are acquired from the host management table, and the usage is changed to "busy" (2911). Next, the LU number, the storage port number and the host-side storage IF port number are registered in the fibre channel switch (2912), and the host indicated by the host name is started (2913).

In the case where the command is "separation" (2920), the host-side storage IF port number corresponding to the host name is acquired from the host management table, and the usage is changed to "unbusy" (2921). Next, the line corresponding to the LU number, the storage number and the host-side storage IF port number of the fibre channel switch is deleted (2922), and the host indicated by the host name is stopped (2923).

The command, which is neither "assignment" nor "separation" but miscellaneous (2930), is not the corresponding one, and an error is output (2931).

Third Embodiment

The first and second embodiments are intended for a system which can realize the scale-out and scale-in states through the load balancer. According to this embodiment, on the other hand, a method is explained in which a plurality of users share the hosts 300 fewer than the users, and a host 300 capable of constructing the environment for the users most quickly is selected in preparation for application.

Figure 30:
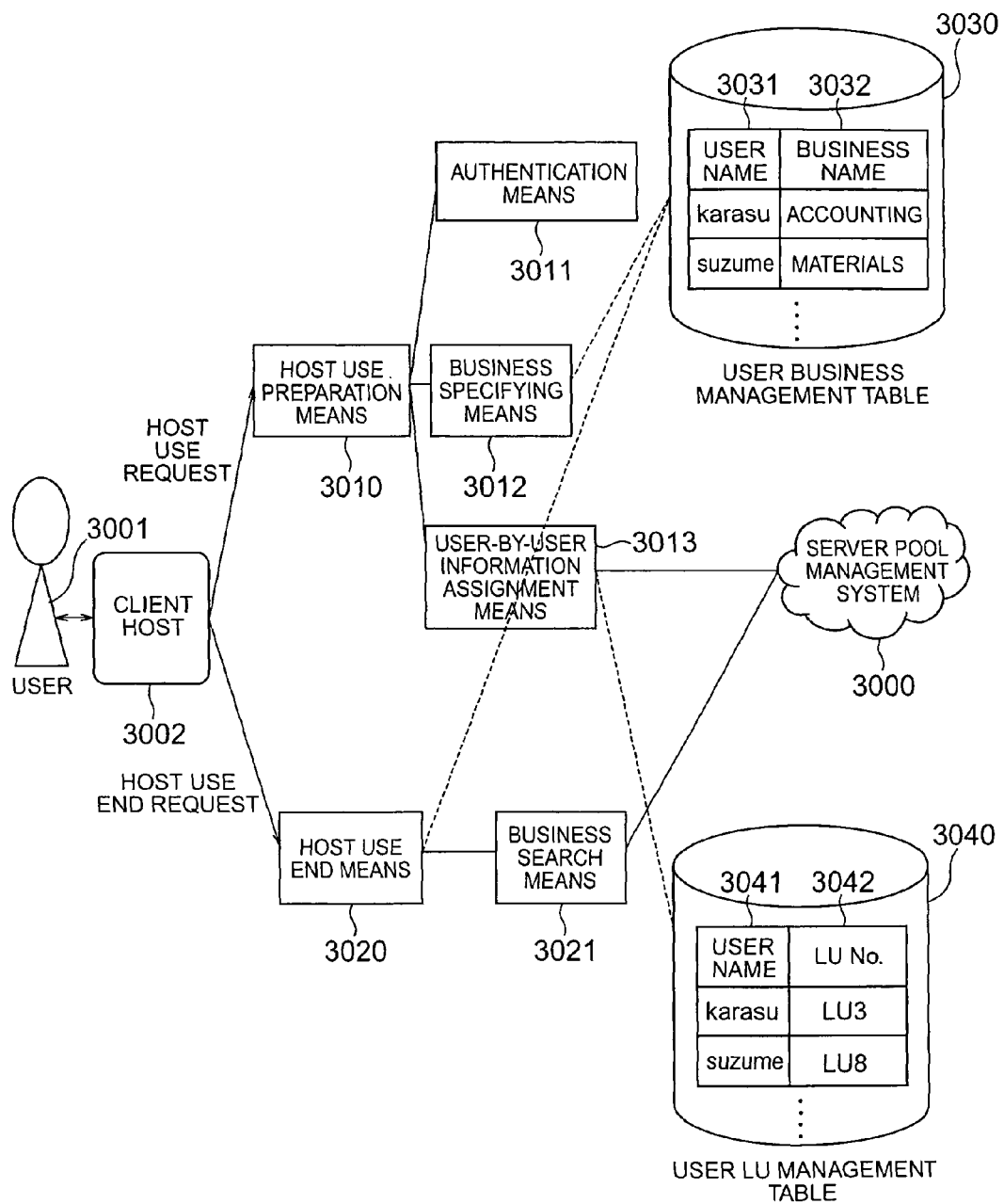
FIG. 30 is a diagram showing a logic configuration of a business utilizing a host for each user.

FIG. 30 is a diagram showing the logic configuration of a business according to this embodiment. The host 300 prepared in this embodiment holds the software environment, and the data prepared for each user 3001 is stored in another storage unit (area). Also, in order to use the host 300, each user is assumed to use a client host 3002. The client host 3002, connected to the network, can receive and display the screen of the host 300 of which the environment is constructed using the server pool management system 3000.

A host use preparation means 3010, upon receipt of a host use request, prepares the host 300. An authentication mean 3011 checks whether the user name and the password input from the user are correct or not. A business specifying means 3012 is for specifying the business name used by the user. A user-by-user information assignment means 3013 manages which user 3001 uses which (area) of the storage units for storing the data prepared for each user and managed separately from the host 300. Although this embodiment assumes the LU in the storage as a storage area, another method may alternatively be employed.

The host use end means 3020 executes the process of ending the use of the host 300 in response to a hose use end request. The business search means 3021 examines the type of the software installed in the host 300 of which the use is ended, and checks whether the business of the same software configuration exists in the existing business or not.

A user business management table 3030 manages the name of the business used by the user. This embodiment, assuming that the software environment is determined for each related department, assumes the name of the related department as a business name. Nevertheless, another software environment can be used for each user.

A user LU management table 3040 manages which LU the user 3001 uses to store the data prepared for each user.

A sever pool management system 3000, as described with reference to the first or second embodiment, deals with no operation of the load balancer 430.

Figure 31:
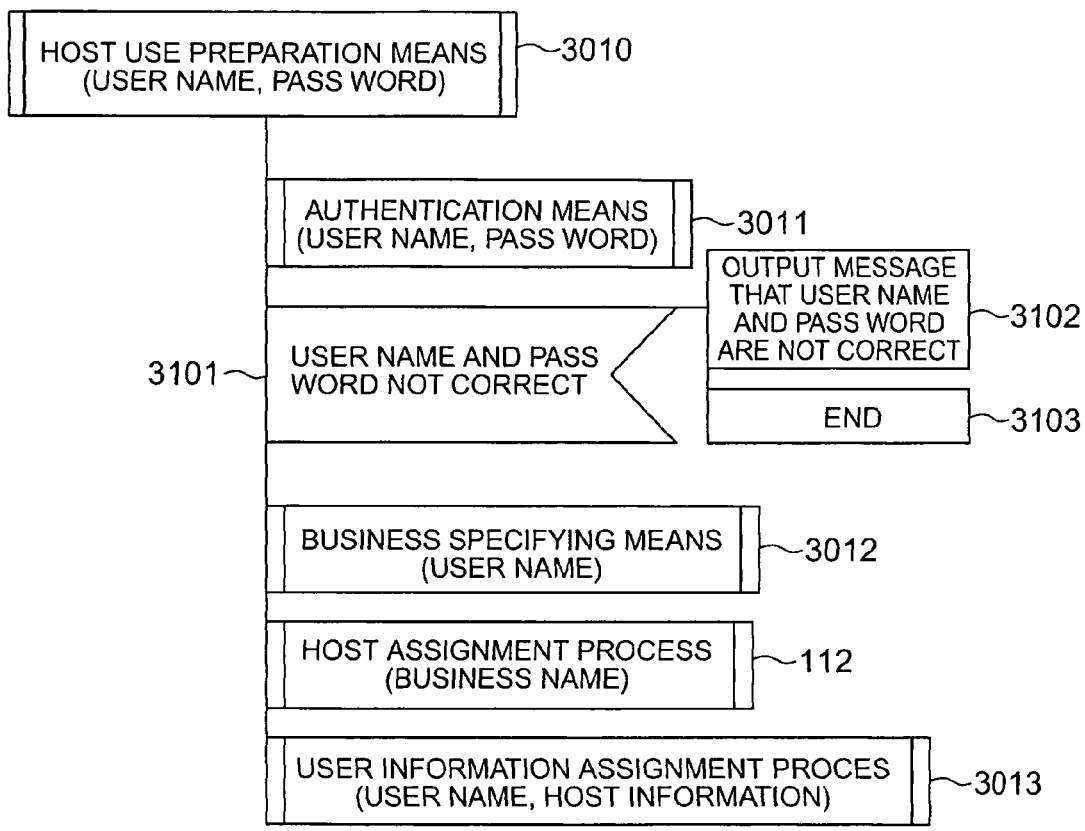
FIG. 31 shows the PAD of a host utilization preparation means 3010 of FIG. 30.

FIG. 31 shows the PAD of the host use preparation means 3010. The host use preparation means 3010 provides the host 300 which has prepared the job environment of the user 3001. The user name and the password are designated as an argument. First, the correctness of the user name and the password is confirmed using the authentication means 3011. In the case where the user name or the password is not correct (3101), the step 3102 for issuing a message that the user name or the password is incorrect is executed and the process is ended (3103).

In the case where the user name and the password are correct, the business used by the user 3001 having the user name delivered as an argument is specified by the business specifying means 3012. The user business management table is used for this specification.

The host assignment process 112 is an internal function of the sever pool management system 3000 and used to acquire the host 300 corresponding to the business name.

In the user-by-user information assignment process 3013, the storage unit (area) to store the data prepared is assigned for each user. Using the user LU management table 3040, the LU number corresponding to the user name delivered as an argument is acquired. Next, the LU of the LU number acquired is made available for the host 300 obtained by the host assignment process 112. This is realized by operating the fibre channel switch using the host information (host name, IP address, host-side storage IF port number, etc.) of the argument.

Figure 32:
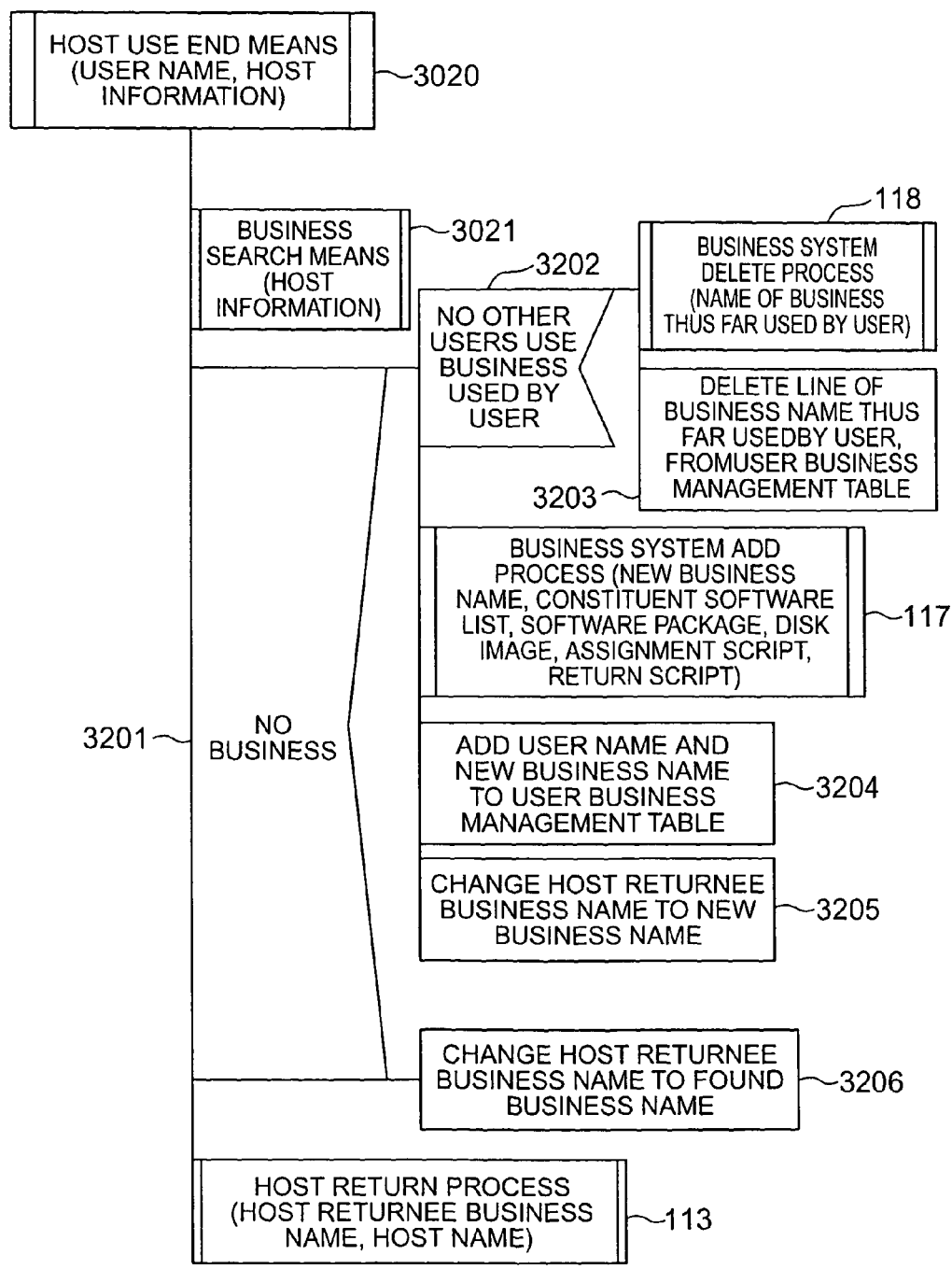
FIG. 32 shows the PAD of a host utilization end means 3020 of FIG. 30.

FIG. 32 shows the PAD of the host use end means 3020. Upon complete use of the host 300, the process of returning the host 300 is executed. As an argument, the user name and the host information are designated. In the business search means 3011, a list of software already installed is acquired through the network from the host 300 indicated by the host information, and the business name of the business having the particular software list is acquired using the group management table 122, etc.

In the absence of the corresponding business (3201), a business is newly added. In the case where the business that has been used by the particular user is not used by any other users (3202), the business corresponding to the name of the business that has been used by the user is deleted by the business system delete process 118, and the line of the name of the business that has been used by the user is deleted from the user business management table (3203).

In the business system add process 117, the business having the list of the software installed in the host 300 returned by the user 3001 is added as an object of management. At the same time, the new business name, the constituent software list, the software package, the disk image, the assignment script and the return script are designated as an argument. Any other required information, if any, may be automatically created or input by the user 3001. Next, the user name and the new business name are added to the user business management table (3104), and the host returnee business name is employed as a new business name (3205).

In the case where the business is found by the business search process 3021, the host returnee business name is designated as the business name thus found (3206).

In the host return process 113, the host 300 is returned to the group corresponding to the LU search path 1901 of the host returnee business name.

As described above, an information system is provided for supplying the functions of a plurality of applications to a plurality of customers using a plurality of computer resources including a virtual computer. This information system is applicable for the information system department of an enterprise or the data center operated by a government agency. The computer resources are connected to a local storage medium, a storage or other external memories through an internal bus, an internet, an optical fiber cable or other communication lines. Even in the case where the processing requests to the information system increase sharply, the deterioration of the response of the application functions is effectively prevented by assigning the process to the standby computers. Also, the active host that has developed a fault can be effectively replaced by a standby computer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for allocation of a computer resource from a server pool to business systems including a first business system and a second business system, comprising the steps executed by a managing computer of:
    (A) storing a first software list indicating a first plurality of software programs required by the first business system, and a second software list indicating a second plurality of software programs required by the second business system;
    (B) in the server pool, and based on the first software list and the second software list, creating:
        a first group for managing all of the first plurality of software programs installed on a first computer;
        a second group for managing all of the second plurality of software programs installed on a second computer; and
        a third group for managing a software program installed on a third computer which is common to both the first plurality of software programs and the second plurality of software programs,
    (C1) for the first business system, searching the first computer from the first group then searching the third computer from the third group, and allocating the searched first computer to the first business system, and
    (C2) for the second business system, searching the second computer from the second group then searching the third computer from the third group, and allocating the searched second computer to the second business system, and
    wherein the managing computer installs an additional software program which is lacking in the first plurality of software programs or second plurality of software programs other than the common software programs installed in the selected computer, if the selected computer is selected from the third group.

2. The method according to claim 1, further comprising the steps executed by a managing computer of:
    (A2) storing a third software list indicating a third plurality of software programs required by a third business system;
    (B2) in the server pool, and based on the first software list, the second software list, and the third software list, creating:
        a fourth group for managing all of the third plurality of software programs installed on a fourth computer;
        a fifth group for managing a software program installed on a fifth computer which is common between the first plurality of software programs, the second plurality of software programs, and the third plurality of software programs,
    (C3) for the third business system, searching the fourth computer from the fourth group then searching the fifth computer from the fifth group, and allocating the searched computer to the third business system,
    wherein the managing computer searching the first computer for the first business system and the second business system from the fifth group in steps (C1) and (C2), after searching from the first, second, and third group, and
    wherein the managing computer installs an additional software program which is lacking in the first, second, or third plurality of software programs other than the common software programs installed in the selected computer, if the selected computer is selected from the fifth group.

3. The method according to claim 2,
    wherein the managing computer moves between groups in the server pool, with referring a number of computers included in each group by installing and uninstalling a software program, for reducing install or uninstall software programs in a computer in the server pool at a timing to allocate a computer to a business system.

* * * * *